(12) United States Patent
Ushiro

(10) Patent No.: US 12,420,812 B2
(45) Date of Patent: Sep. 23, 2025

(54) IN-VEHICLE SYSTEM AND IN-VEHICLE ECU

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Shota Ushiro, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 289 days.

(21) Appl. No.: 18/001,097

(22) PCT Filed: May 26, 2021

(86) PCT No.: PCT/JP2021/019994
§ 371 (c)(1),
(2) Date: Dec. 8, 2022

(87) PCT Pub. No.: WO2021/251143
PCT Pub. Date: Dec. 16, 2021

(65) Prior Publication Data
US 2023/0211794 A1 Jul. 6, 2023

(30) Foreign Application Priority Data
Jun. 11, 2020 (JP) .................................. 2020-101882

(51) Int. Cl.
*B60W 50/023* (2012.01)
*B60W 50/02* (2012.01)

(52) U.S. Cl.
CPC ...... *B60W 50/023* (2013.01); *B60W 50/0205* (2013.01)

(58) Field of Classification Search
CPC ............ B60W 50/023; B60W 50/0205; B60R 16/0231; G06F 11/2007; G06F 11/2038; G06F 11/2048; G05B 9/03
See application file for complete search history.

(56) References Cited

U.S. PATENT DOCUMENTS 5,001,641 A     3/1991   Makino
11,173,922 B2 * 11/2021   Sakamoto ............. B60W 30/18
(Continued)

FOREIGN PATENT DOCUMENTS

JP    2004-189163 A    7/2004
JP    2015-067187 A    4/2015
(Continued)

OTHER PUBLICATIONS

International Search Report, Application No. PCT/JP2021/019994, mailed Aug. 17, 2021. ISA/Japan Patent Office.

*Primary Examiner* — Jonathan M Dager
(74) *Attorney, Agent, or Firm* — Honigman LLP

(57) ABSTRACT

An in-vehicle system includes: a first in-vehicle device installed in a vehicle; a second in-vehicle device controlled in accordance with a signal output from the first in-vehicle device; a first in-vehicle ECU communicably connected to the first in-vehicle device and the second in-vehicle device by signal lines; and a second in-vehicle ECU communicably connected to the first in-vehicle device and the second in-vehicle device by the signal lines. The first in-vehicle ECU and the second in-vehicle ECU are connected by a communication line of a type different from a type of the signal lines, and a communication path from the first in-vehicle device to the second in-vehicle device includes a (Continued)

first path relayed by the first in-vehicle ECU and a second path relayed by the second in-vehicle ECU.

20 Claims, 18 Drawing Sheets

(56) References Cited

U.S. PATENT DOCUMENTS

| | | | |
|---|---|---|---|
| 11,354,114 B2* | 6/2022 | Ishikawa | G06F 8/66 |
| 11,427,212 B2* | 8/2022 | Higashitani | G07C 5/0808 |
| 11,535,107 B2* | 12/2022 | Liu | B60L 3/0092 |
| 11,708,080 B2* | 7/2023 | Jung | B60W 60/00186 |
| | | | 701/29.2 |
| 11,724,708 B2* | 8/2023 | Gong | B60W 10/18 |
| | | | 701/26 |
| 11,820,442 B2* | 11/2023 | Won | B62D 5/046 |
| 11,960,877 B2* | 4/2024 | Ishikawa | H04L 67/34 |
| 12,012,119 B2* | 6/2024 | Suenaga | G06F 1/3206 |
| 12,054,166 B2* | 8/2024 | Deckmyn | B60W 50/029 |
| 12,093,149 B2* | 9/2024 | Grabs | G06F 11/2038 |
| 2004/0243287 A1* | 12/2004 | Yanaka | B60W 50/02 |
| | | | 701/33.6 |
| 2010/0057292 A1* | 3/2010 | Ishikawa | G07C 5/085 |
| | | | 701/31.4 |
| 2010/0198473 A1 | 8/2010 | Strengert et al. | |
| 2018/0046161 A1* | 2/2018 | Yhr | G05B 9/03 |
| 2018/0178831 A1* | 6/2018 | Toko | H02P 27/04 |
| 2018/0370540 A1* | 12/2018 | Yousuf | B60W 10/04 |
| 2019/0009813 A1* | 1/2019 | Siskoy | B62D 5/0484 |
| 2019/0039644 A1* | 2/2019 | Bernon-Enjalbert | |
| | | | B62D 5/0493 |
| 2019/0100105 A1* | 4/2019 | Liu | B60L 15/20 |
| 2019/0138296 A1* | 5/2019 | Ishikawa | H04L 67/12 |
| 2019/0243363 A1* | 8/2019 | Kim | B60W 50/023 |
| 2019/0250611 A1* | 8/2019 | Costin | G05D 1/228 |
| 2019/0300009 A1* | 10/2019 | Sakamoto | B60W 50/035 |
| 2019/0381895 A1* | 12/2019 | Shindo | B60L 15/2081 |
| 2020/0139982 A1* | 5/2020 | Sakamoto | G06F 11/18 |
| 2020/0280461 A1* | 9/2020 | Kaku | H04L 12/40182 |
| 2021/0224169 A1* | 7/2021 | Kang | G06F 11/3006 |
| 2021/0269048 A1* | 9/2021 | Herges | B60T 17/221 |
| 2021/0311724 A1* | 10/2021 | Ishikawa | G06F 8/654 |
| 2022/0006667 A1* | 1/2022 | Yasunori | B60R 16/02 |
| 2022/0017107 A1* | 1/2022 | Shinoda | B60W 60/00186 |
| 2022/0080990 A1* | 3/2022 | Chi | B60W 60/00186 |
| 2022/0080992 A1* | 3/2022 | Yousuf | B60W 50/023 |
| 2022/0121179 A1* | 4/2022 | Sakata | G05B 9/02 |
| 2022/0161809 A1* | 5/2022 | Belling | B60R 16/0231 |
| 2023/0067056 A1* | 3/2023 | Cho | G01R 33/07 |
| 2023/0192139 A1* | 6/2023 | Kumavat | B60W 50/0098 |
| | | | 701/25 |
| 2023/0271628 A1* | 8/2023 | Watts | G06V 10/87 |
| | | | 701/28 |
| 2024/0253646 A1* | 8/2024 | Rathour | B60W 50/0205 |
| 2024/0300501 A1* | 9/2024 | Rathour | B60W 50/023 |
| 2024/0317245 A1* | 9/2024 | Morlok | G05B 9/03 |
| 2024/0331466 A1* | 10/2024 | Kobayashi | B60W 50/14 |

FOREIGN PATENT DOCUMENTS

| | | | | |
|---|---|---|---|---|
| WO | WO-2018225352 A1 * | 12/2018 | | B60W 30/18 |
| WO | WO-2022180908 A1 * | 9/2022 | | B60L 58/18 |

* cited by examiner

IN-VEHICLE SYSTEM AND IN-VEHICLE ECU

CROSS-REFERENCE TO RELATED APPLICATIONS

This application is the U.S. national stage of PCT/JP2021/019994, filed on May 26, 2021, which claims priority of Japanese Patent Application No. JP 2020-101882, filed on Jun. 11, 2020, the contents of which are incorporated herein.

TECHNICAL FIELD

The present disclosure relates to an in-vehicle system and an in-vehicle ECU.

BACKGROUND

Vehicles are equipped with in-vehicle Electronic Control Units (ECUs), such as brake ECUs, for controlling in-vehicle devices such as power train systems for engine control and the like, body systems for air conditioning control and the like, and so on. The vehicle is equipped with an in-vehicle system that includes a plurality of these in-vehicle ECUs, control devices such as a brake control unit and the like connected to the respective plurality of in-vehicle ECUs, and actuators for brakes and the like directly connected to the control devices (see JP 2015-67187A, for example).

The in-vehicle system described in JP 2015-67187A does not take into account redundancy in the connections between actuators and control devices or in-vehicle ECUs.

An object of the present disclosure is to provide an in-vehicle system and the like which can achieve redundancy in communications with in-vehicle devices such as actuators and the like.

SUMMARY

An in-vehicle system according to one aspect of the present disclosure is an in-vehicle system including: a first in-vehicle device installed in a vehicle; a second in-vehicle device controlled in accordance with a signal output from the first in-vehicle device; a first in-vehicle ECU communicably connected to the first in-vehicle device and the second in-vehicle device by signal lines; and a second in-vehicle ECU communicably connected to the first in-vehicle device and the second in-vehicle device by the signal lines. The first in-vehicle ECU and the second in-vehicle ECU are connected by a communication line of a type different from a type of the signal lines, and a communication path from the first in-vehicle device to the second in-vehicle device includes a first path relayed by the first in-vehicle ECU and a second path relayed by the second in-vehicle ECU.

Advantageous Effects of Present Disclosure

According to one aspect of the present disclosure, an in-vehicle system and the like can be provided which achieve redundancy in communications with in-vehicle devices such as actuators and the like.

DETAILED DESCRIPTION OF PREFERRED EMBODIMENTS

Figure 1:
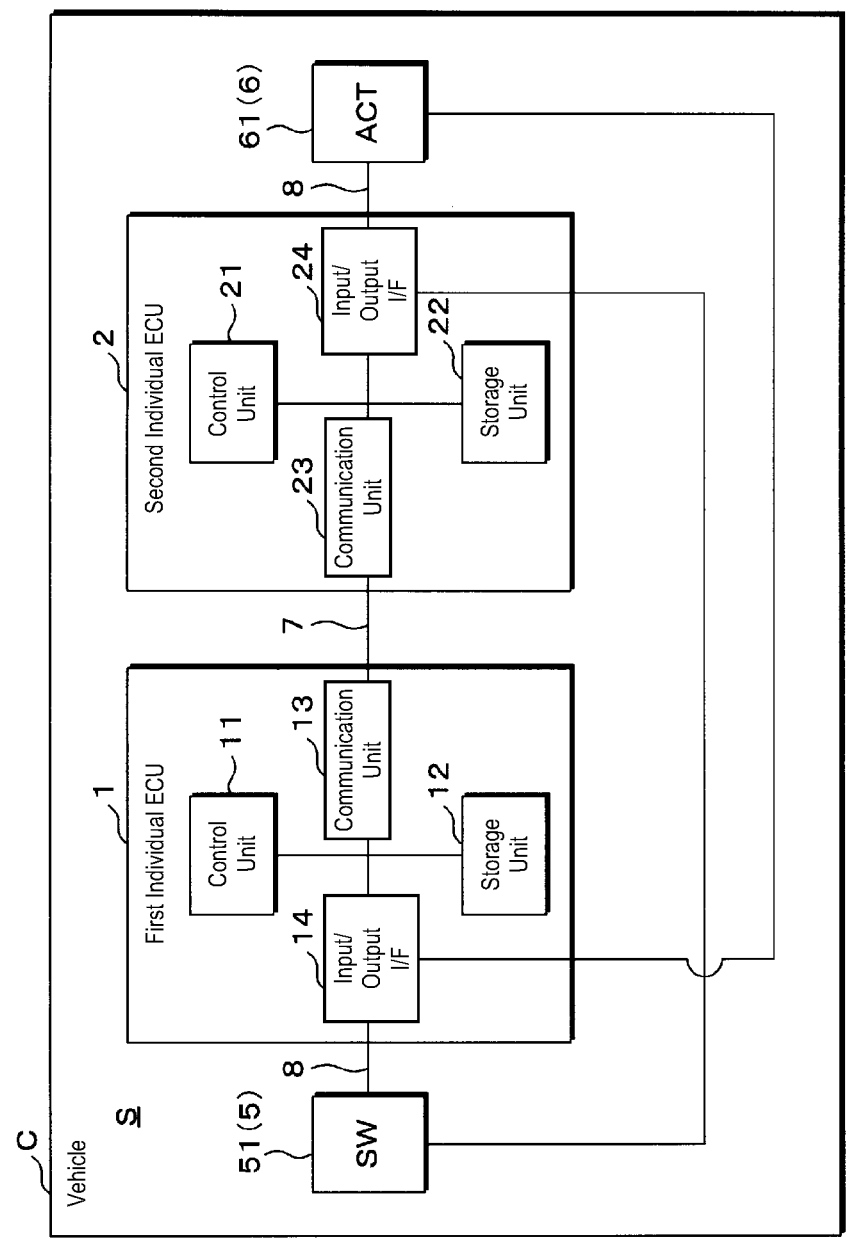
FIG. 1 is a schematic diagram illustrating an example of the configuration of an in-vehicle system according to a first embodiment.

First, embodiments of the present disclosure will be described as examples. The embodiments described hereinafter may be at least partially combined as desired.

First Aspect

An in-vehicle system according to a first aspect of the present disclosure is an in-vehicle system including: a first in-vehicle device installed in a vehicle; a second in-vehicle device controlled in accordance with a signal output from the first in-vehicle device; a first in-vehicle ECU communicably connected to the first in-vehicle device and the second in-vehicle device by signal lines; and a second in-vehicle ECU communicably connected to the first in-vehicle device and the second in-vehicle device by the signal lines. The first in-vehicle ECU and the second in-vehicle ECU are connected by a communication line of a type different from a type of the signal lines, and a communication path from the first in-vehicle device to the second in-vehicle device includes a first path relayed by the first in-vehicle ECU and a second path relayed by the second in-vehicle ECU.

In the first aspect, the first in-vehicle device, and the second in-vehicle device controlled in accordance with the signal output from the first in-vehicle device, are respectively connected to the first in-vehicle ECU and the second in-vehicle ECU by the signal lines, and the first in-vehicle ECU and the second in-vehicle ECU are connected by the communication line. In such a connection structure, the communication path from the first in-vehicle device to the second in-vehicle device includes the first path relayed by the first in-vehicle ECU and the second path relayed by the second in-vehicle ECU. The connection path between the first in-vehicle device and the second in-vehicle device can therefore be made redundant, and the availability of communication can be improved.

Second Aspect

In the in-vehicle system according to a second aspect of the present disclosure, the first in-vehicle ECU and the second in-vehicle ECU each includes a control unit that obtains a signal from the first in-vehicle device over the signal line and generates control data for controlling the second in-vehicle device based on the signal output from the first in-vehicle device. Each of the control units of the first in-vehicle ECU and the second in-vehicle ECU is configured to determine, based on a result of communication between the first in-vehicle ECU and the second in-vehicle ECU over the communication line, whether the other in-vehicle ECU is normal or is malfunctioning. When the first in-vehicle ECU is determined to be malfunctioning, the second in-vehicle ECU substitutes for the first in-vehicle ECU, and when the second in-vehicle ECU is determined to be malfunctioning, the first in-vehicle ECU substitutes for the second in-vehicle ECU.

In the second aspect, each of the control units of the first in-vehicle ECU and the second in-vehicle ECU mutually or complementarily determines whether the other in-vehicle ECU is normal or is malfunctioning. When the first in-vehicle ECU is determined to be malfunctioning, the second in-vehicle ECU substitutes for the first in-vehicle ECU, and when the second in-vehicle ECU is determined to be malfunctioning, the first in-vehicle ECU substitutes for the second in-vehicle ECU. In other words, when one of the first in-vehicle ECU and the second in-vehicle ECU is determined to be malfunctioning, the in-vehicle ECU determined to be malfunctioning mutually or complementarily can be substituted for, which makes it possible to improve the reliability of processing for generating control data based on the signal from the first in-vehicle device.

Third Aspect

In the in-vehicle system according to a third aspect of the present disclosure, the control unit of the second in-vehicle ECU is configured to substitute for the first in-vehicle ECU by outputting the control data to the second in-vehicle device through the second path when the control unit of the second in-vehicle ECU determines that the first in-vehicle ECU is malfunctioning, and the control unit of the first in-vehicle ECU is configured to substitute for the second in-vehicle ECU by outputting the control data to the second in-vehicle device through the first path when the control unit of the first in-vehicle ECU determines that the second in-vehicle ECU is malfunctioning.

In the third aspect, the connection path between the first in-vehicle device and the second in-vehicle device is made redundant via the first in-vehicle ECU and the second in-vehicle ECU. When the first in-vehicle ECU is determined to be malfunctioning, the control unit of the second in-vehicle ECU outputs control data to the second in-vehicle device through the second path, whereas when the second in-vehicle ECU is determined to be malfunctioning, the control unit of the first in-vehicle ECU outputs control data to the second in-vehicle device through the first path. Accordingly, even if the first in-vehicle ECU or the second in-vehicle ECU is determined to be malfunctioning, processing for outputting the control data generated by either one of the first in-vehicle ECU or the second in-vehicle ECU to the second in-vehicle device can be performed reliably using the redundant connection path between the first in-vehicle device and the second in-vehicle device.

Fourth Aspect

In the in-vehicle system according a fourth aspect of the present disclosure, when both the first in-vehicle ECU and the second in-vehicle ECU are determined to be normal, communication from the first in-vehicle device to the second in-vehicle device is performed via the first in-vehicle ECU and the second in-vehicle ECU.

In the fourth aspect, when both the first in-vehicle ECU and the second in-vehicle ECU are determined to be normal, the control data is output to the second in-vehicle device via the first in-vehicle ECU and the second in-vehicle ECU, i.e., over the communication line connecting the first in-vehicle ECU and the second in-vehicle ECU. Accordingly, in a series of processes involving both the first in-vehicle device and the second in-vehicle device, the respective instances of processing can be distributed between the first in-vehicle ECU, which receives the signal from the first in-vehicle device, and the second in-vehicle ECU, which outputs the control data to the second in-vehicle device. The load is therefore distributed between the first in-vehicle ECU and the second in-vehicle ECU, which makes it possible to perform the series of processes efficiently.

Fifth Aspect

In the in-vehicle system according to fifth aspect of the present disclosure, the control unit of the second in-vehicle ECU is configured to, after obtaining the signal from the first in-vehicle device, determine, when a signal output from the first in-vehicle ECU is not obtained within a predetermined period, that the first in-vehicle ECU is malfunctioning, and determine, when the signal output from the first in-vehicle ECU is obtained within the predetermined period, that the first in-vehicle ECU is normal.

In fifth aspect, the control unit of the second in-vehicle ECU determines that the first in-vehicle ECU is malfunctioning if the signal output from the first in-vehicle ECU is not obtained within the predetermined period after obtaining the signal from the first in-vehicle device, and determines that the first in-vehicle ECU is normal if the stated signal is obtained. Accordingly, the control unit of the second in-vehicle ECU can efficiently determine whether the first in-vehicle ECU is normal or is malfunctioning.

Sixth Aspect

In the in-vehicle system according to a sixth aspect of the present disclosure, the control unit of the first in-vehicle ECU is configured to, after obtaining the signal from the first in-vehicle device, determine, when a response from the second in-vehicle device is not obtained within a predetermined period, that the second in-vehicle ECU is malfunctioning, and determine, when the response from the second in-vehicle device is obtained within the predetermined period, that the second in-vehicle ECU is normal.

In the sixth aspect, the control unit of the first in-vehicle ECU determines that the second in-vehicle ECU is malfunctioning if a response from the second in-vehicle device is not obtained within a predetermined period after obtaining the signal from the first in-vehicle device, and determines that the second in-vehicle ECU is normal if the response from the second in-vehicle device is obtained within the predetermined period. Accordingly, the control unit of the first in-vehicle ECU can efficiently determine whether the second in-vehicle ECU is normal or is malfunctioning.

Seventh Aspect

In the in-vehicle system according to a seventh aspect of the present disclosure, the control unit of the first in-vehicle ECU is configured to: further output, when a response to the signal is not obtained from the second in-vehicle device within a predetermined period, a confirmation signal to the second in-vehicle ECU over the communication line; determine, when a response to the confirmation signal is not obtained from the second in-vehicle ECU, that the second in-vehicle ECU is malfunctioning; and determine, when a response to the confirmation signal is obtained from the second in-vehicle ECU, that the second in-vehicle ECU is normal.

In seventh aspect, if a response to the signal is not obtained from the second in-vehicle device within a predetermined period, a confirmation signal is further output to the second in-vehicle device over the communication line. The second in-vehicle ECU is determined to be malfunctioning if a response to the confirmation signal is not obtained from the second in-vehicle device, and the second in-vehicle ECU is determined to be normal if the response is obtained. If the response to the signal is not obtained from the second in-vehicle device within the predetermined period, it is assumed that the second in-vehicle device or the second in-vehicle ECU is malfunctioning, and by further outputting a confirmation signal to the second in-vehicle ECU over the communication line, whether the second in-vehicle ECU is normal or is malfunctioning can be determined reliably based on whether or not there is a response from the second in-vehicle ECU.

Eighth Aspect

The in-vehicle system according to an eighth aspect of the present disclosure further includes a third in-vehicle ECU connected to the first in-vehicle ECU and the second in-vehicle ECU by communication lines. A control unit of the third in-vehicle ECU is configured to determine, based on a result of communication with the first in-vehicle ECU and the second in-vehicle ECU over the communication lines, whether the first in-vehicle ECU and the second in-vehicle ECU are normal or are malfunctioning. When the first in-vehicle ECU is determined to be malfunctioning, the second in-vehicle ECU substitutes for the first in-vehicle ECU, and when the second in-vehicle ECU is determined to be malfunctioning, the first in-vehicle ECU substitutes for the second in-vehicle ECU.

In the eighth aspect, the control unit of the third in-vehicle ECU, which is connected to the first in-vehicle ECU and the second in-vehicle ECU by communication lines, determines whether the first in-vehicle ECU and the second in-vehicle ECU are normal or are malfunctioning based on results of communication with the first in-vehicle ECU and the second in-vehicle ECU, which makes it unnecessary for the first in-vehicle ECU and the second in-vehicle ECU to handle that determination processing. Accordingly, the load of the processing involving both the first in-vehicle device and the second in-vehicle device can be distributed by the first in-vehicle ECU, the second in-vehicle ECU, and the third in-vehicle ECU, and the availability of the in-vehicle system can be improved.

Ninth Aspect

In the in-vehicle system according to a ninth aspect of the present disclosure, the control unit of the third in-vehicle ECU is configured to determine whether the first in-vehicle ECU and the second in-vehicle ECU are normal or are malfunctioning based on a result of obtaining signal detection data output from the first in-vehicle ECU and the second in-vehicle ECU in accordance with a signal output by the first in-vehicle device.

In the ninth aspect, the control unit of the third in-vehicle ECU determines whether the first in-vehicle ECU and the second in-vehicle ECU are normal or are malfunctioning based on a result of obtaining the signal detection data output from the first in-vehicle device and the second in-vehicle ECU in accordance with the signal output from the first in-vehicle device, and can therefore make the determinations for the first in-vehicle ECU and the second in-vehicle ECU in correspondence with the output of the signal by the first in-vehicle ECU.

Tenth Aspect

In the in-vehicle system according to a tenth aspect of the present disclosure, the third in-vehicle ECU is connected to the first in-vehicle device and the second in-vehicle device via the first in-vehicle ECU or the second in-vehicle ECU rather than being directly connected by the signal lines.

In the tenth aspect, the third in-vehicle ECU is not directly connected to the first in-vehicle device and the second in-vehicle device by the signal lines, but is instead connected via the first in-vehicle ECU or the second in-vehicle ECU. Accordingly, it is not necessary to provide signal lines between the third in-vehicle ECU and the first and second in-vehicle devices.

Eleventh Aspect

An in-vehicle ECU according to a eleventh aspect of the present disclosure is an in-vehicle ECU communicably connected by signal lines to a first in-vehicle device and a second in-vehicle device installed in a vehicle. The in-vehicle ECU is connected, by a communication line of a type different from a type of the signal lines, to another in-vehicle ECU communicably connected to the first in-vehicle device and the second in-vehicle device by the signal lines. The in-vehicle ECU includes a control unit configured to obtain a signal from the first in-vehicle device over the signal line and generates control data for controlling the second in-vehicle device based on the signal output from the first in-vehicle device. The control unit is configured to determine whether the other in-vehicle ECU is normal or is malfunctioning based on a result of communication with the other in-vehicle ECU, and when the other in-vehicle ECU is determined to be malfunctioning, perform processing substituting for the other in-vehicle ECU.

In the eleventh aspect, an in-vehicle ECU constituting an in-vehicle system which can achieve redundancy in communications with in-vehicle devices such as actuators and the like can be provided.

The present disclosure will be described in detail on the basis of drawings illustrating embodiments thereof. In-vehicle ECUs according to embodiments of the present disclosure (individual ECUs 1, 2, and 3, and an integrated ECU 4) will be described hereinafter with reference to the drawings. Note that the present disclosure is not intended to be limited to these examples, and is defined instead by the scope of the appended claims. All changes that fall within the same essential spirit as the scope of the claims are intended to be included therein as well.

First Embodiment

An embodiment will be described hereinafter based on the drawings. FIG. 1 is a schematic diagram illustrating an example of the configuration of an in-vehicle system S according to a first embodiment. The in-vehicle system S includes a first individual ECU 1 and a second individual ECU 2 installed in a vehicle C. The first individual ECU 1 and the second individual ECU 2, respectively, are communicably connected to a switch 51, which is a first in-vehicle device 5, and an actuator 61, which is a second in-vehicle device 6, by signal lines 8.

The first individual ECU 1 and the second individual ECU 2 are communicably connected to each other by a communication line 7, and are disposed in respective areas of the vehicle C. The first individual ECU 1 and the second individual ECU 2, and the communication line 7 connecting those ECUs, constitute an in-vehicle network (an in-vehicle LAN). The first individual ECU 1 and the second individual ECU 2 may also function as in-vehicle relay devices, such as gateways or Ethernet switches, that relay communication between the first in-vehicle device 5 (the switch 51) and the second in-vehicle device 6 (the actuator 61). In addition to relaying related to communication, the first individual ECU 1 and the second individual ECU 2 may be Power Lan Boxes (PLBs) that function as power distribution devices which distribute and relay power output from a power storage device (not shown) and supply the power to the in-vehicle devices connected to those ECUs themselves, such as the first in-vehicle device 5, the second in-vehicle device 6, or the like.

As illustrated in the drawings, the first in-vehicle device 5 is, for example, the switch 51, generates a signal based on an operation from an operator of the vehicle C or the like, and outputs the generated signal to the first individual ECU 1 and the second individual ECU 2 over the signal lines 8. An example of the switch 51 will be given later.

As illustrated in the drawings, the second in-vehicle device 6 is the actuator 61, for example, and is a drive device driven based on the signal output from the switch 51, which is the first in-vehicle device 5. An example of the actuator 61 will be described later.

As illustrated in the drawings, the first individual ECU 1 is directly connected to each of the first in-vehicle device 5 (the switch 51) and the second in-vehicle device 6 (the actuator 61) by the communication line 7. Similar to the first individual ECU 1, the second individual ECU 2 is directly connected to each of the switch 51 and the actuator 61 by the signal lines 8. In this manner, a redundant connection structure is achieved by the connections between the first individual ECU 1 and the second individual ECU 2, and between the first in-vehicle device 5 (the switch 51) and the second in-vehicle device 6 (the actuator 61), being doubled by the signal lines 8.

By having such a redundant configuration, even if an abnormal state has arisen due to the first individual ECU 1 or the second individual ECU 2 malfunctioning or the like, the other individual ECU can substitute for the malfunctioning individual ECU. Accordingly, communication of the first in-vehicle device 5 (the switch 51) and the second in-vehicle device 6 (the actuator 61) can be maintained, which makes it possible to improve the availability of the in-vehicle system S. A "malfunction" in the first individual ECU 1 or the second individual ECU 2 includes not only malfunctions of those individual ECUs themselves, but also failures caused by disconnects in any of the signal lines 8 connecting the first in-vehicle device 5 (the switch 51) and the second in-vehicle device 6 (the actuator 61). The first individual ECU 1 configured in this manner corresponds to a "first in-vehicle ECU", and the second individual ECU 2, to a "second in-vehicle ECU".

The in-vehicle system S includes a first path relayed by the first individual ECU 1 and a second path relayed by the second individual ECU 2, which makes it possible to achieve redundancy with respect to a malfunction in any of the individual ECUs or a failure caused by a disconnect or the like in any of the signal lines 8. The first path and the second path are formed by the first in-vehicle device 5 and the second in-vehicle device 6, the signal lines 8 that directly connect the first individual ECU 1 and the second individual ECU 2, and the communication line 7 that directly connects the first individual ECU 1 to the second individual ECU 2. With respect to the signal lines 8 and the communication line 7, from the perspective of the in-vehicle network, the communication line 7 corresponds to a backbone line and the signal lines 8 correspond to branch lines, and the communication line 7 and the signal lines 8 are based on different physical layer protocols. In the present embodiment, making the signal lines 8 redundant makes it possible to configure a robust in-vehicle network.

The first individual ECU 1 includes a control unit 11, a storage unit 12, an input/output I/F 14, and a communication unit 13. The control unit 11 is constituted by a Central Processing Unit (CPU), a Micro Processing Unit (MPU), or the like, and performs various types of control processes, computational processes, and the like by reading out and executing control programs and data stored in the storage unit 12 in advance. The control unit 11 is not limited to a software processing unit that performs software processing, such as a CPU, and may include a hardware processing unit that performs various types of control processes, computational processes, and the like through hardware processing, such as an FPGA, an ASIC, a SOC, or the like. For example, the control unit 11 may receive, using a hardware processing unit such as an FPGA, an input signal from the switch 51, such as a door SW 52 or the like connected through an input/output I/F. Then, by starting up the software processing unit such as a CPU or the like, the hardware processing unit may use the CPU to perform processing related to the input signal from the switch 51. In this manner, by starting up the CPU using, as a trigger, the processing of the FPGA or the like performed in response to current or voltage from the input signal from the switch 51, the power consumed by the CPU can be reduced.

The storage unit 12 is constituted by a volatile memory device such as Random Access Memory (RAM), or a non-volatile memory device such as Read-Only Memory (ROM), Electrically Erasable Programmable ROM (EE-PROM), or flash memory. Control programs and data referenced during processing are stored in the storage unit 12 in advance. The control programs stored in the storage unit 12 may be control programs that have been stored after being read out from a recording medium which can be read by the first individual ECU 1. Alternatively, the control programs may be downloaded from an external computer (not shown) connected to a communication network (not shown), and stored in the storage unit 12.

The input/output I/F 14 is a communication interface for serial communication, for example. The first individual ECU 1 is communicably connected to the first in-vehicle device 5 and the second in-vehicle device 6 by the signal lines 8, which are wire harnesses or the like, connected to the input/output I/F 14.

The communication unit 13 is an input/output interface, such as a CAN transceiver, an Ethernet PHY unit, or the like using a communication protocol such as Control Area Network (CAN), Ethernet (registered trademark), or the like, for example. The control unit 11 communicates with the second individual ECU 2, which is another individual ECU connected to the in-vehicle network, or with other in-vehicle devices such as relay devices or the like, through the communication unit.

Similar to the first individual ECU 1, the second individual ECU 2 includes a control unit 21, a storage unit 22, an input/output I/F 24, and a communication unit 23. The control unit 21, the storage unit, the input/output I/F 24, and the communication unit 23 of the second individual ECU 2 have configurations similar to those of the first individual ECU 1. Control programs and data stored in the storage unit of the second individual ECU 2 are the same as, or are compatible with, the control programs and data stored in the storage unit 12 of the first individual ECU 1.

If the first individual ECU 1 and the second individual ECU 2 have the same or mutually-compatible hardware configurations and software configurations in this manner, even if one of the individual ECUs malfunctions, the other individual ECU can, as a substitute, perform the functions to be executed by the individual ECU which is malfunctioning.

Figure 2:
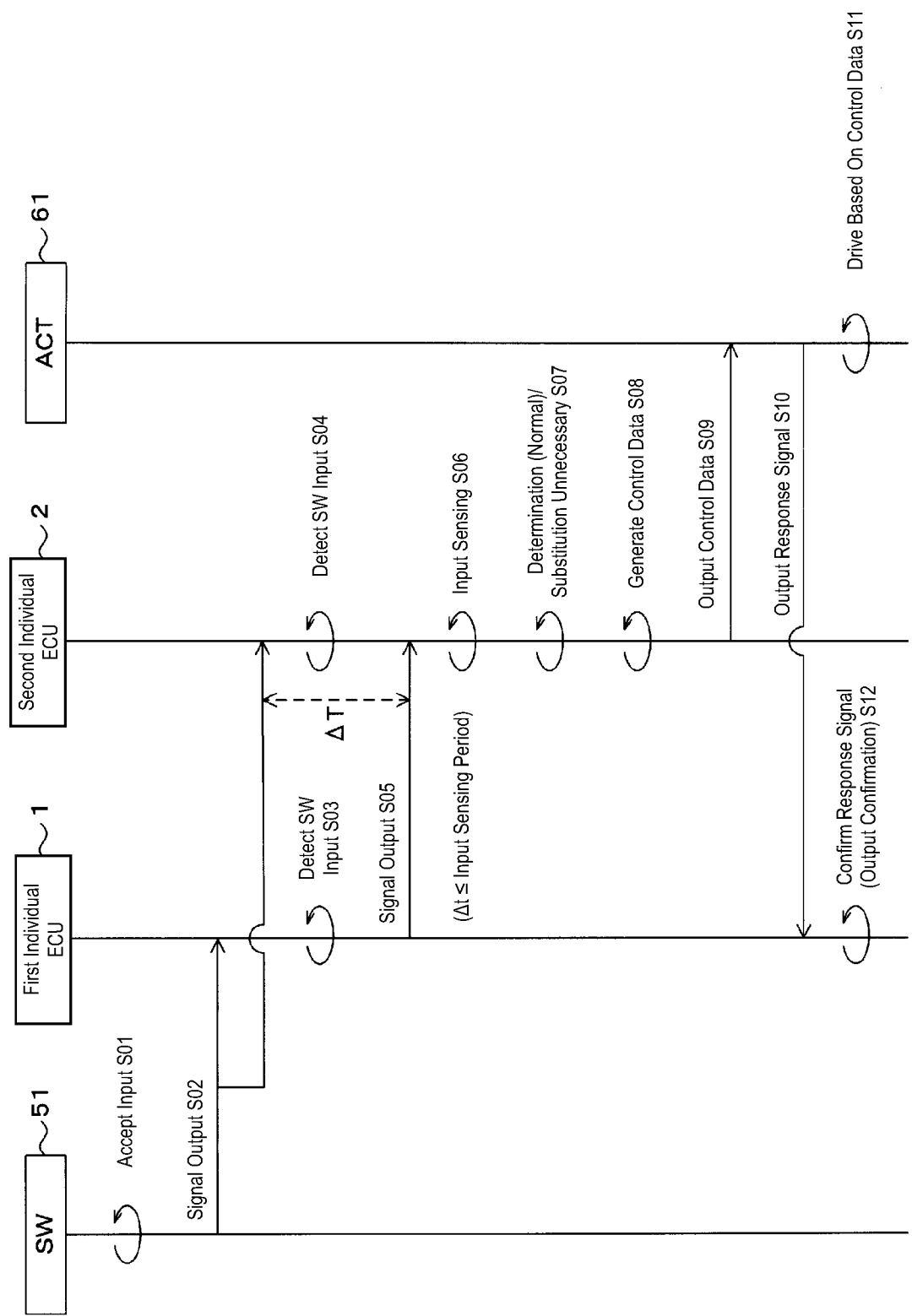
FIG. 2 is a descriptive diagram illustrating an example of one form of each of processes performed by a first individual ECU and the like (under normal conditions).

FIG. 2 is a descriptive diagram illustrating an example of one form of each of processes performed by the first individual ECU 1 and the like (under normal conditions). In the present embodiment, the first individual ECU 1 functions as a SW input main ECU that mainly performs processing on signals received from the switch 51, which is the first in-vehicle device 5, or in other words, processing corresponding to the input signal from the switch 51 (a SW input signal). The second individual ECU 2 functions as an ACT output main ECU that mainly generates and outputs control data for the actuator 61, which is the second in-vehicle device 6, or in other words, performs processing corresponding to control data output to the actuator 61 (ACT output). On top of this, if the second individual ECU 2 is malfunctioning, the first individual ECU 1 functions as an ACT output sub ECU that, as a substitute, performs the processing corresponding to the output of control data to the actuator 61 (the ACT output). If the first individual ECU 1 is malfunctioning, the second individual ECU 2 functions as a SW input sub ECU that, as a substitute, performs the processing corresponding to the input signal from the switch 51 (the SW input).

A flow of processing when both the first individual ECU 1 and the second individual ECU 2 are normal in the present embodiment will be described with reference to the drawings. The switch 51 accepts the input of an operation made by the operator of the vehicle C, for example (S01). The switch 51 generates a signal based on a result of accepting the input (the SW input signal), and outputs that signal (the SW input signal) to the first individual ECU 1 and the second individual ECU 2 over the signal lines 8 (S02).

The switch 51 includes various sensors, for example, and accepts the input from the operation made by the operator based on a sensing result from the sensors. Alternatively, the switch 51 may be connected to a sensing device such as a COMS camera, Light Detection and Ranging (LiDAR), or the like, accept an input of various types of data output from such a sensing device, and output a signal.

The first individual ECU 1 and the second individual ECU 2 detect the signal output from the switch 51 (the SW input signal) (S03, S04). By detecting the signal output from the switch 51 (the SW input signal), the first individual ECU 1 and the second individual ECU 2 obtain (receive) that signal.

Based on the signal output from the switch 51 (the SW input signal), the first individual ECU 1 generates a signal for instructing control data to be generated (an instruction signal), and outputs that signal (the instruction signal) to the second individual ECU 2 (instruction signal output) (S05).

The second individual ECU 2 detects the signal output from the first individual ECU 1 (the instruction signal) (S06). The second individual ECU 2 detects the signal output from the first individual ECU 1 (the instruction signal) within a predetermined period from the point in time when the signal output from the switch 51 (the SW input signal) is detected. This "predetermined period" is a period determined based on the time required for the processing performed by the first individual ECU 1 (an input sensing period), and is a period for determining that the first individual ECU 1 is malfunctioning if the signal from the first individual ECU 1 cannot be obtained within that input sensing period. The value of the input sensing period is stored in the storage unit 22 of the second individual ECU 2, for example.

Based on a result of detecting the signal output from the first individual ECU 1 (the instruction signal), the second individual ECU 2 determines that the first individual ECU 1 is normal and that substitution is not necessary (S07).

Based on the signal output from the first individual ECU 1 (the instruction signal), the second individual ECU 2 generates control data (S08).

The second individual ECU 2 outputs the generated control data to the actuator 61 (S09).

Based on the control data output from the second individual ECU 2, the actuator 61 generates a response signal, and outputs the generated response signal to the first individual ECU 1 (S10).

Based on the control data output from the second individual ECU 2, the actuator 61 drives its own device (S11).

The first individual ECU 1 confirms the response signal output from the actuator 61 (output confirmation) (S12). Based on the result of confirming the response signal output from the actuator 61 (the output confirmation), the first individual ECU 1 determines that the second individual ECU 2 is normal and that substitution is not necessary.

By obtaining the response signal output from the actuator 61, the first individual ECU 1 can determine that the second individual ECU 2 is normal. In this manner, the first individual ECU 1 and the second individual ECU 2 can efficiently determine whether the other individual ECU is normal or is malfunctioning based on results of communication with the switch 51 and the actuator 61, and a result of communication between the first individual ECU 1 and the second individual ECU 2. When determining whether the other individual ECU is normal or is malfunctioning based on these communication results, the first individual ECU 1 and the second individual ECU 2 can make the determination efficiently by determining that the other individual ECU is malfunctioning when communication from the other individual ECU or the actuator 61 cannot be obtained within the predetermined period.

Figure 3:
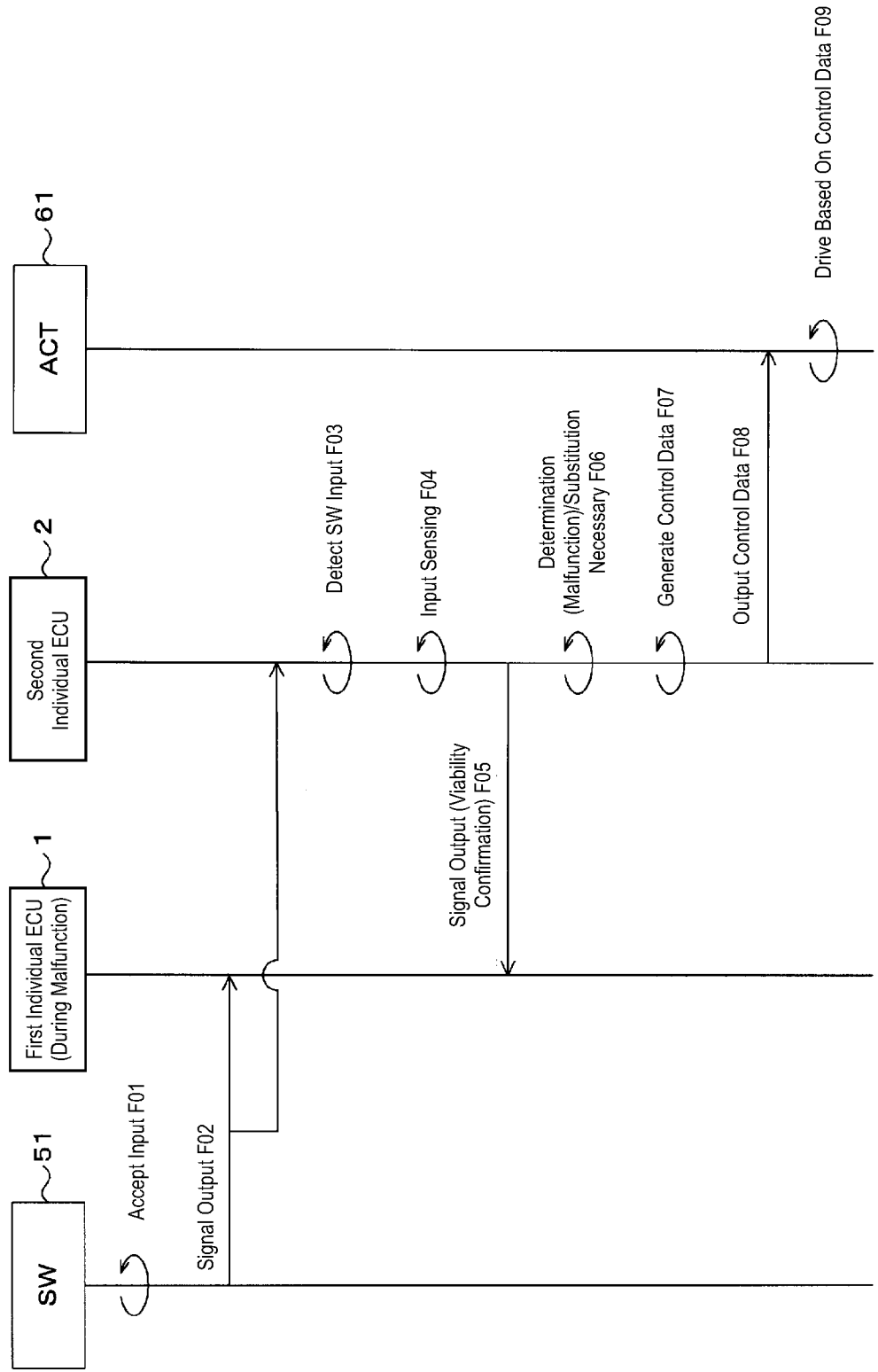
FIG. 3 is a descriptive diagram illustrating an example of one form of each of processes performed by the first individual ECU and the like (during first individual ECU malfunction).

FIG. 3 is a descriptive diagram illustrating an example of one form of each of processes performed by the first individual ECU 1 and the like (when the first individual ECU 1 is malfunctioning). A flow of processing when the first individual ECU 1 is malfunctioning and the second individual ECU 2 is normal in the present embodiment will be described with reference to the drawings.

Similar to when the first individual ECU 1 and the second individual ECU 2 are normal, the switch 51 accepts an input (F01), and outputs the generated signal (the SW input signal) to the first individual ECU 1 and the second individual ECU 2 over the signal lines 8 (F02).

The second individual ECU 2 detects the signal output from the switch 51 (the SW input signal) (F03). Because the first individual ECU 1 is malfunctioning, the signal output from the switch 51 (the SW input signal) cannot be detected.

The second individual ECU 2 attempts to detect the signal which should be output from the first individual ECU 1 (the instruction signal) (F04). The first individual ECU 1 is malfunctioning, and thus the second individual ECU 2 cannot detect the signal from the first individual ECU 1. The second individual ECU 2 outputs a signal for confirming viability (a viability confirmation signal) to the first individual ECU 1 (F05). Because the first individual ECU 1 is malfunctioning, the second individual ECU 2 cannot obtain a response to the viability confirmation signal from the first individual ECU 1.

The second individual ECU 2 determines that the first individual ECU 1 is malfunctioning and substitution is necessary (F06). Based on the signal from the switch 51 detected in F03, the second individual ECU 2 generates control data (F07) and outputs the generated control data to the actuator 61 (F08).

Based on the control data obtained from the second individual ECU 2, the actuator 61 drives its own device (F09).

Figure 4:
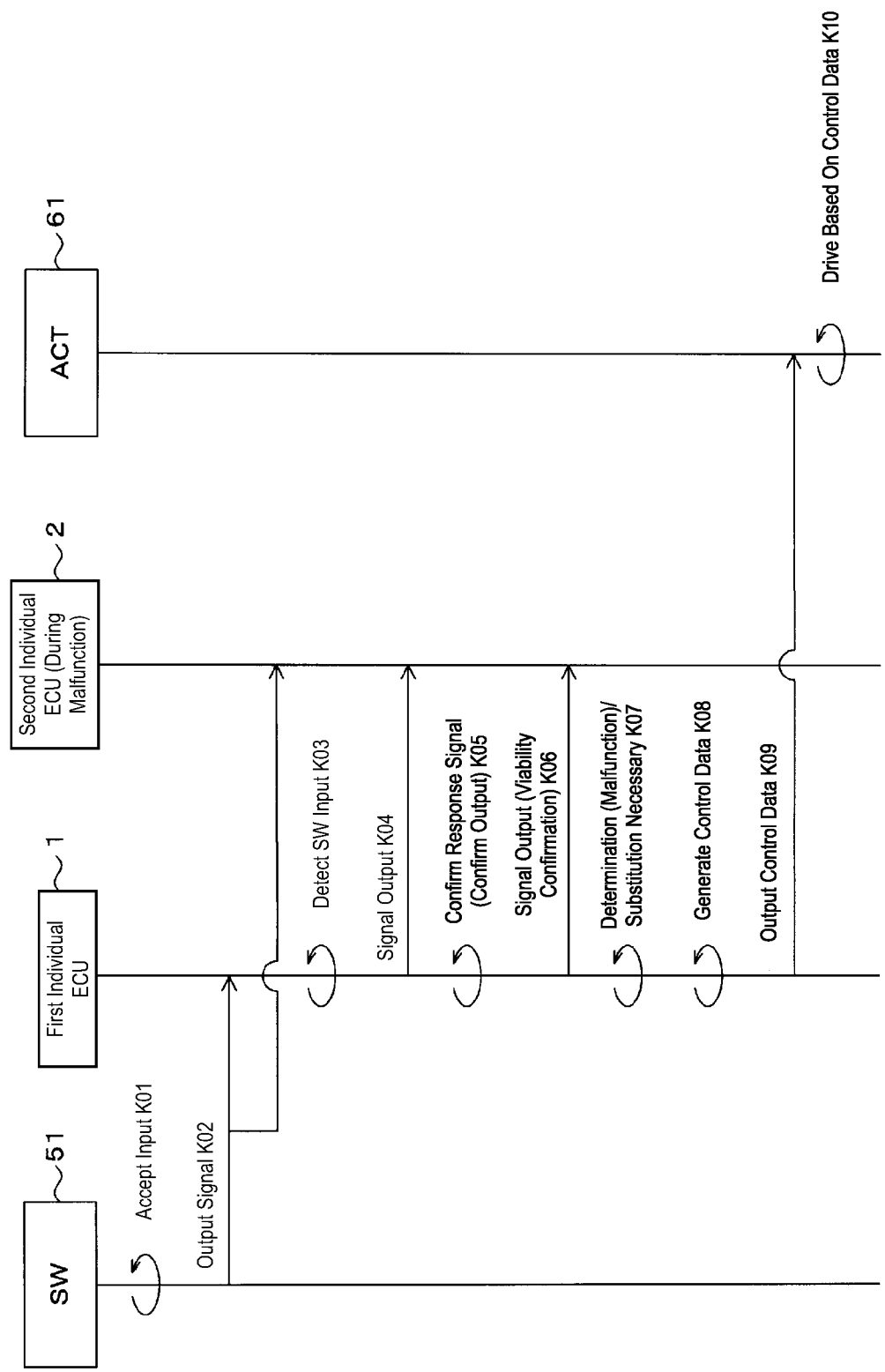
FIG. 4 is a descriptive diagram illustrating an example of one form of each of processes performed by the first individual ECU and the like (during second individual ECU malfunction).

FIG. 4 is a descriptive diagram illustrating an example of one form of each of processes performed by the first individual ECU 1 and the like (when the second individual ECU 2 is malfunctioning). A flow of processing when the first individual ECU 1 is normal and the second individual ECU 2 is malfunctioning in the present embodiment will be described with reference to the drawings.

Similar to when the first individual ECU 1 and the second individual ECU 2 are normal, the switch 51 accepts an input (K01), and outputs the generated signal (the SW input signal) to the first individual ECU 1 and the second individual ECU 2 over the signal lines 8 (K02).

The first individual ECU 1 detects the signal output from the switch 51 (the SW input signal) (K03). Because the second individual ECU 2 is malfunctioning, the signal output from the switch 51 (the SW input signal) cannot be detected.

Based on the signal output from the switch 51 (the SW input signal), the first individual ECU 1 generates a signal for instructing control data to be generated (an instruction signal), and outputs that signal to the second individual ECU 2 (instruction signal output) (K04). The second individual ECU 2 is malfunctioning, and thus the signal output from the first individual ECU 1 (the instruction signal) cannot be obtained.

The first individual ECU 1 attempts to confirm the response signal which should be output from the actuator 61 (output confirmation) (K05). Because the second individual ECU 2 is malfunctioning, the actuator 61 cannot obtain the control data. Accordingly, at this point in time, the response signal is not being output from the actuator 61 to the first individual ECU 1, and thus the first individual ECU 1 does not confirm the response signal which should be output from the actuator 61, i.e., does not obtain that response signal.

The first individual ECU 1 outputs a signal for confirming viability (a viability confirmation signal) to the second individual ECU 2 (K06). Because the second individual ECU 2 is malfunctioning, the first individual ECU 1 cannot obtain a response to the viability confirmation signal from the second individual ECU 2.

The first individual ECU 1 determines that the second individual ECU 2 is malfunctioning and substitution is necessary (K07). Based on the signal output from the switch 51 (the SW input signal), the first individual ECU 1 generates control data (K08), and outputs the generated control data to the actuator 61 (K09).

Based on the control data obtained from the second individual ECU 2, the actuator 61 drives its own device (K10).

Figure 5:
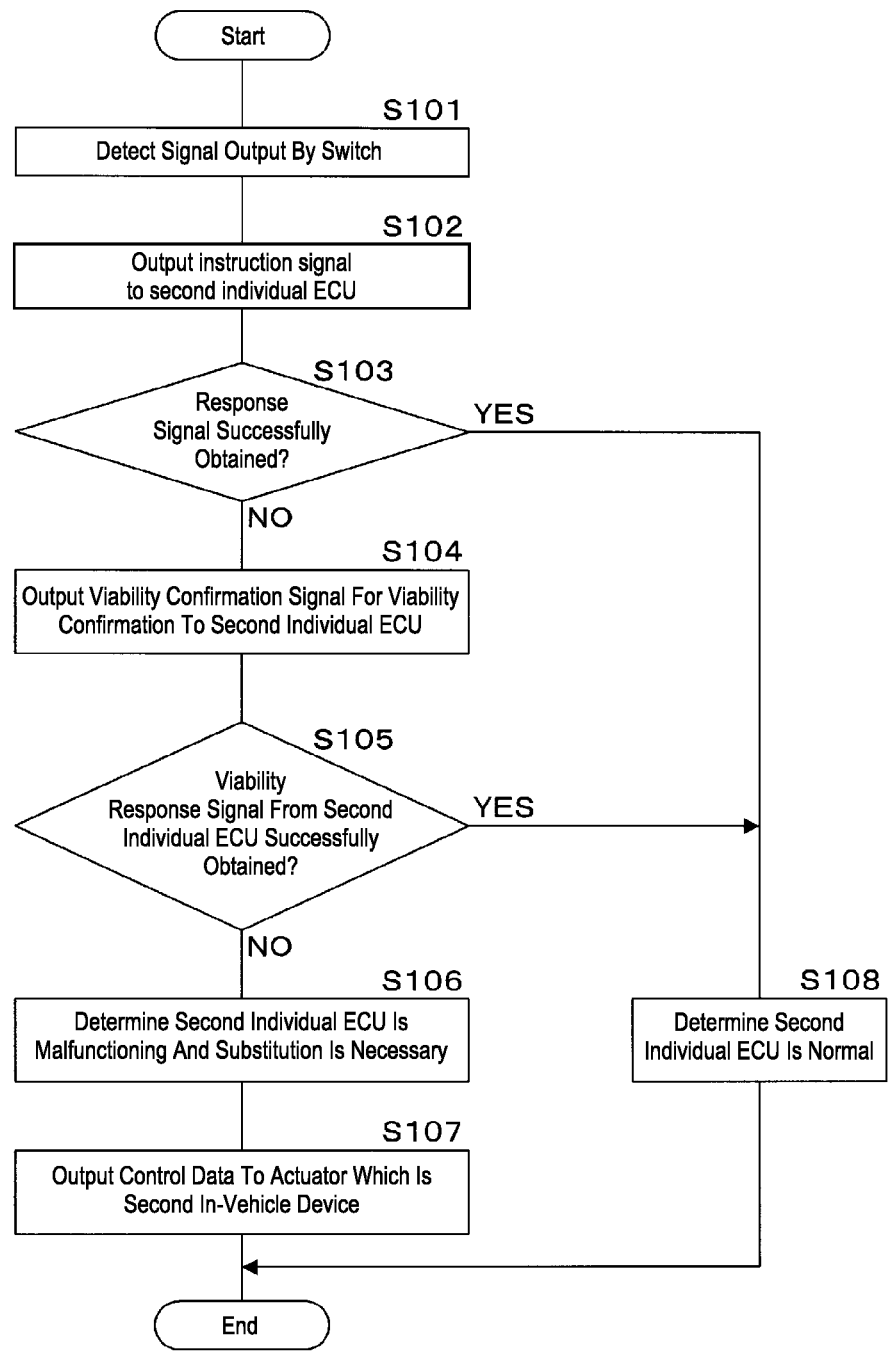
FIG. 5 is a flowchart illustrating an example of processing performed by a control unit of the first individual ECU.

FIG. 5 is a flowchart illustrating an example of processing performed by the control unit 11 of the first individual ECU 1. The control unit 11 of the first individual ECU 1 performs the following processing regularly while, for example, the vehicle C is in a started state (the ignition switch is on) or in a stopped state (the ignition switch is off).

The control unit 11 of the first individual ECU 1 detects (obtains) the signal output from the switch 51, which is the first in-vehicle device 5 (S101).

Based on the signal output by the switch 51, the control unit 11 of the first individual ECU 1 generates an instruction signal and outputs that instruction signal to the second individual ECU 2 (S102). Based on the signal output by the switch 51, the control unit 11 of the first individual ECU 1 generates a signal instructing the generation of control data (an instruction signal) and outputs that instruction signal to the second individual ECU 2.

The control unit 11 of the first individual ECU 1 determines whether the response signal output by the actuator 61, which is the second in-vehicle device 6, was successfully obtained (confirmed) (S103). If the response signal was successfully obtained (confirmed) (S103: YES), the control unit 11 of the first individual ECU 1 determines that the second individual ECU 2 is operating normally (S108), and ends the series of processes. When ending this series of processes, the control unit 11 of the first individual ECU 1 may determine that the second individual ECU 2 is operating normally and store the result of the determination in the storage unit 12 of the first individual ECU 1.

If the response signal could not be successfully obtained (confirmed) (S103: NO), the control unit 11 of the first individual ECU 1 outputs the viability confirmation signal for confirming viability to the second individual ECU 2 (S104).

The control unit 11 of the first individual ECU 1 determines whether a viability response signal was successfully obtained from the second individual ECU 2 in response to the viability confirmation signal (S105). If the viability response signal from the second individual ECU 2 was successfully obtained (S105: YES), the control unit 11 of the first individual ECU 1 determines that the second individual ECU 2 is operating normally (S108), and ends the series of processes. When ending this series of processes, the control unit 11 of the first individual ECU 1 may determine that the second individual ECU 2 is operating normally and store the result of the determination in the storage unit 12 of the first individual ECU 1.

If the viability response signal could not be successfully obtained from the second individual ECU 2 (S105: NO), the control unit 11 of the first individual ECU 1 determines that the second individual ECU 2 is malfunctioning and substitution is necessary (S106).

The control unit 11 of the first individual ECU 1 generates control data based on the signal obtained from the switch 51, which is the first in-vehicle device 5, and outputs that control data to the actuator 61, which is the second in-vehicle device 6 (S107). Based on the control data output from the first individual ECU 1, the actuator 61, which is the second in-vehicle device 6, drives its own device.

Figure 6:
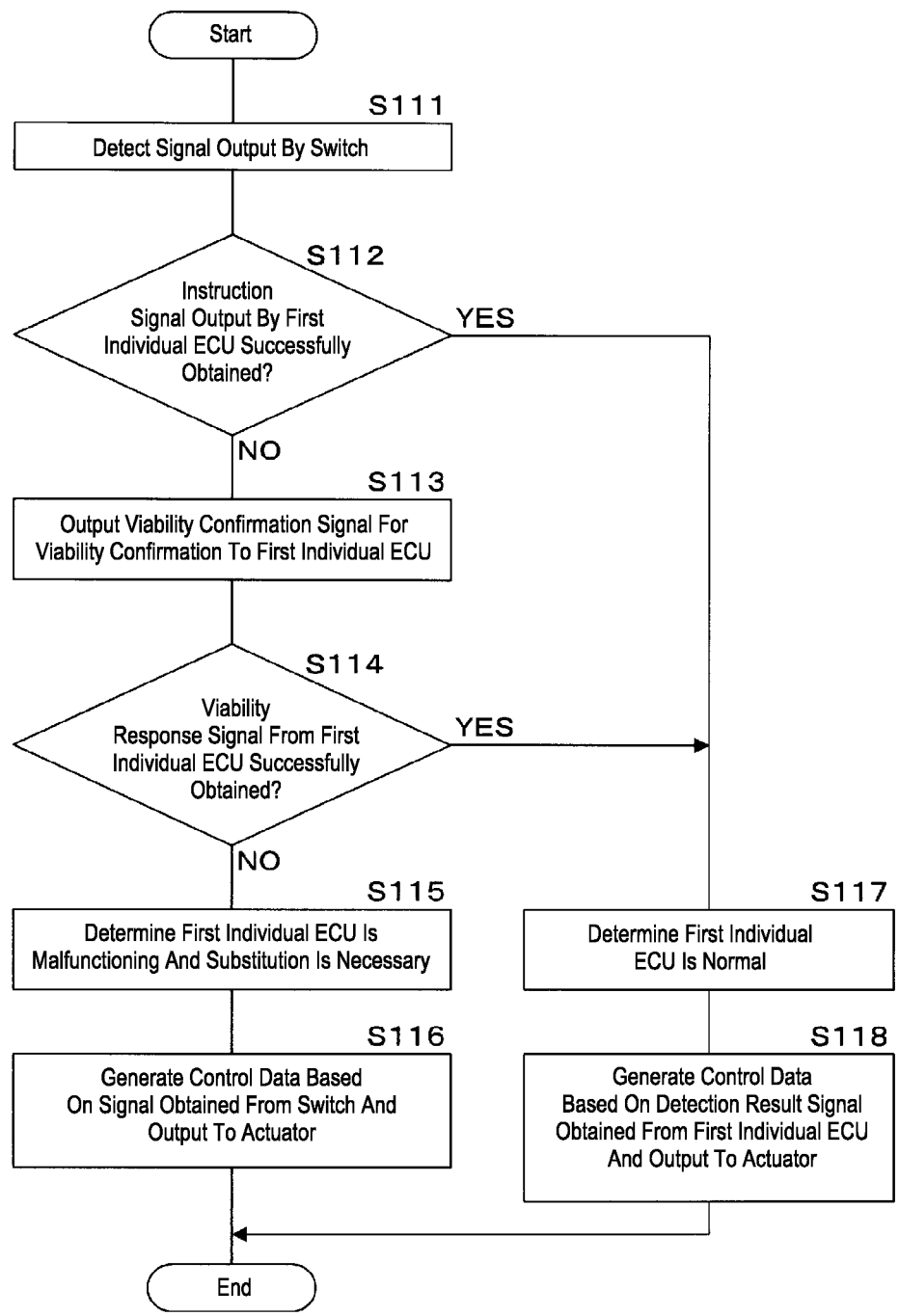
FIG. 6 is a flowchart illustrating an example of processing performed by a control unit of the second individual ECU.

FIG. 6 is a flowchart illustrating an example of processing performed by the control unit 21 of the second individual ECU 2. The control unit 21 of the second individual ECU 2 performs the following processing regularly while, for example, the vehicle C is in a started state (the ignition switch is on) or in a stopped state (the ignition switch is off).

The control unit 21 of the second individual ECU 2 detects (obtains) the signal output from the switch 51, which is the first in-vehicle device 5 (S111). The control unit 21 of the second individual ECU 2 determines whether the instruction signal output by the first individual ECU 1 was successfully obtained (confirmed) (S112). The control unit 21 of the second individual ECU 2 refers to the input sensing period stored in the storage unit 22 of the second individual ECU 2, and determines whether the instruction signal output by the first individual ECU 1 was successfully obtained within the input sensing period. The input sensing period may be determined based on, for example, a maximum processing time assumed by the first individual ECU 1, starting from the point in time when the signal output by the switch 51 is detected.

If the instruction signal was successfully obtained (S112: YES), the control unit 21 of the second individual ECU 2 determines that the first individual ECU 1 is normal and substitution is not necessary (S117). The control unit 21 of the second individual ECU 2 generates control data based on the instruction signal obtained from the first individual ECU 1 and outputs the control data to the actuator 61 (S118). Based on the control data output from the second individual ECU 2, the actuator 61, which is the second in-vehicle device 6, drives its own device.

If the instruction signal could not be successfully obtained (S112: NO), the control unit 21 of the second individual ECU 2 outputs the viability confirmation signal for confirming viability to the first individual ECU 1 (S113). The control unit 21 of the second individual ECU 2 determines whether a viability response signal was successfully obtained from the first individual ECU 1 in response to the viability confirmation signal (S114).

If the viability response signal from the first individual ECU 1 was successfully obtained (S114: YES), the control unit 21 of the second individual ECU 2 determines that the first individual ECU 1 is operating normally (S117), and performs S118, which is the subsequent processing.

If the viability response signal could not be successfully obtained from the first individual ECU 1 (S114: NO), the control unit 21 of the second individual ECU 2 determines that the first individual ECU 1 is malfunctioning and substitution is necessary (S115). The control unit 21 of the second individual ECU 2 generates control data based on the signal obtained from the switch 51, which is the first in-vehicle device 5, and outputs that control data to the actuator 61 (S116). Based on the control data output from the second individual ECU 2, the actuator 61, which is the second in-vehicle device 6, drives its own device.

According to the present embodiment, the first in-vehicle device 5 such as the switch 51, and the second in-vehicle device 6 such as the actuator 61, which is controlled according to a signal output from the first in-vehicle device 5, are respectively connected to the first individual ECU 1 and the second individual ECU 2 by the signal lines 8, and the first individual ECU 1 and the second individual ECU 2 are connected by the communication line 7. A communication path from the first in-vehicle device 5 to the second in-vehicle device 6 includes the first path, which is relayed by the first individual ECU 1, and the second path, which is relayed by the second individual ECU 2, which makes the connection paths between the first in-vehicle device 5 and the second in-vehicle device 6 redundant and makes it possible to improve the availability of communication.

According to the present embodiment, the first individual ECU 1 and the second individual ECU 2 determine for each other whether the other individual ECU is normal or is malfunctioning, and if the first individual ECU 1 is determined to be malfunctioning, the second individual ECU 2 substitutes for the first individual ECU 1, whereas if the second individual ECU 2 is determined to be malfunctioning, the first individual ECU 1 substitutes for the second individual ECU 2. In other words, if one of the first individual ECU 1 and the second individual ECU 2 is determined to be malfunctioning, the other ECU mutually or complementarily substitute for the individual ECU determined to be malfunctioning. Accordingly, the control data can be generated based on the signal from the first in-vehicle device 5, which makes it possible to improve the reliability of the processing for driving the second in-vehicle device 6 using that control data.

Second Embodiment

Figure 7:
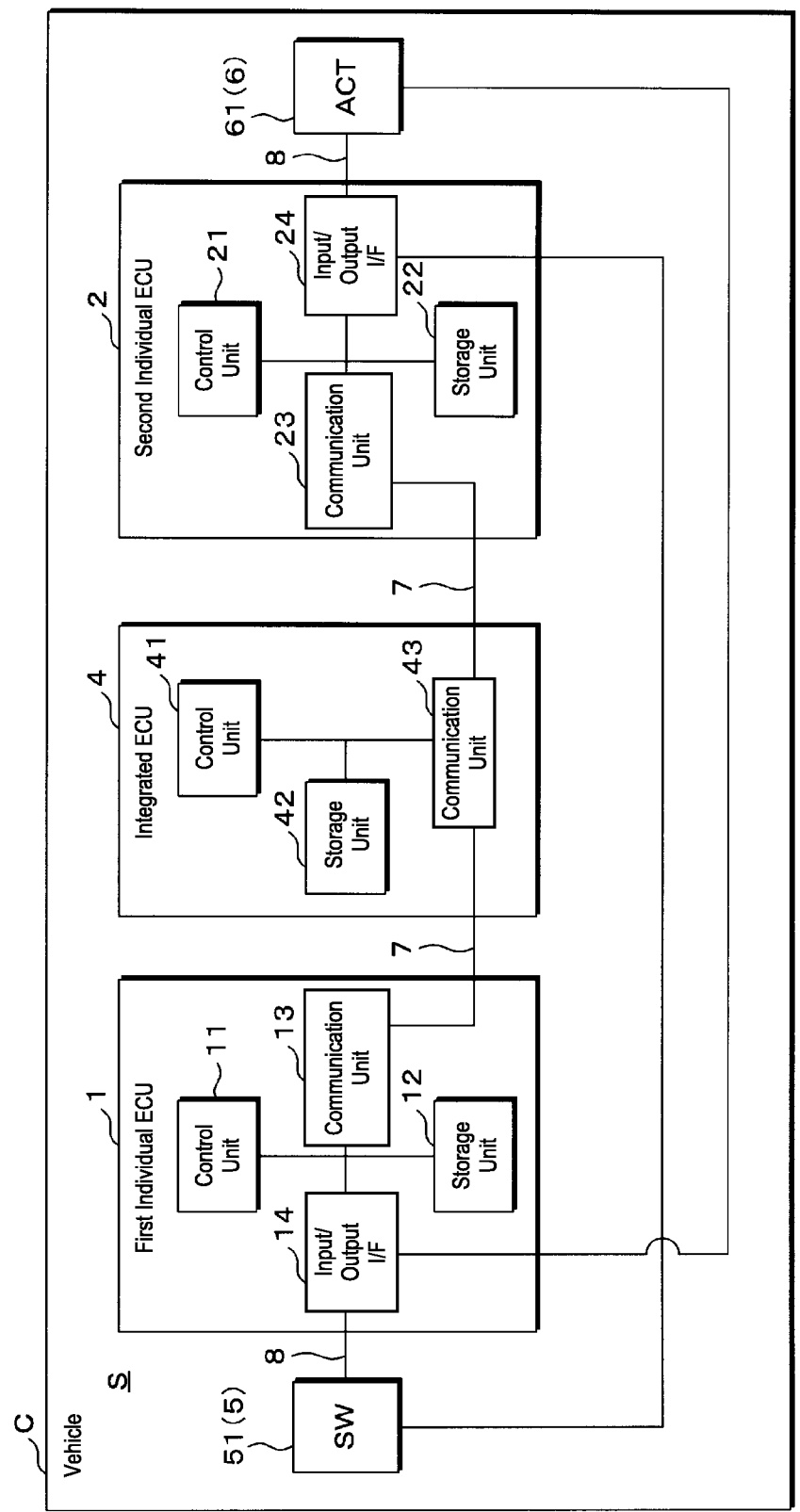
FIG. 7 is a schematic diagram illustrating an example of the configuration of an in-vehicle system according to a second embodiment (an integrated ECU).

FIG. 7 is a schematic diagram illustrating an example of the configuration of the in-vehicle system S according to a second embodiment (the integrated ECU 4). The in-vehicle system S includes the first individual ECU 1, the second individual ECU 2, and the integrated ECU 4, which are installed in the vehicle C. The first individual ECU 1 and the second individual ECU 2 respectively are communicably connected to the switch 51, which is the first in-vehicle device 5, and the actuator 61, which is the second in-vehicle device 6, by the signal lines 8, similar to the first embodiment.

The first individual ECU 1 and the second individual ECU 2 are connected by the communication lines 7 through the integrated ECU 4. Accordingly, the integrated ECU 4 is directly connected to the first individual ECU 1 and the second individual ECU 2 by two communication lines 7, which configures an in-vehicle network having a star-shaped topology centered on the integrated ECU 4. The integrated ECU 4 is connected only to the first individual ECU 1 and the second individual ECU 2, and is not directly connected to the first in-vehicle device 5 and the second in-vehicle device 6 by the signal lines 8.

The integrated ECU 4 determines whether the individual ECUs are normal or are malfunctioning based on communication with the first individual ECU 1 and the second individual ECU 2, performs processing pertaining to substitution instructions to the first individual ECU 1 or the second individual ECU 2 based on a result of the determination, and is, for example, a central control device such as a vehicle computer or the like. Similar to the first individual ECU 1, the integrated ECU 4 includes a control unit 41, a storage unit 42, and a communication unit 43. The control unit 41, the storage unit 42, and the communication unit 43 of the integrated ECU 4 are similar to those of the first individual ECU 1. Control programs and data necessary for performing the stated processing are stored in the storage unit 42 of the integrated ECU 4. The integrated ECU 4 corresponds to a third in-vehicle ECU.

Figure 8:
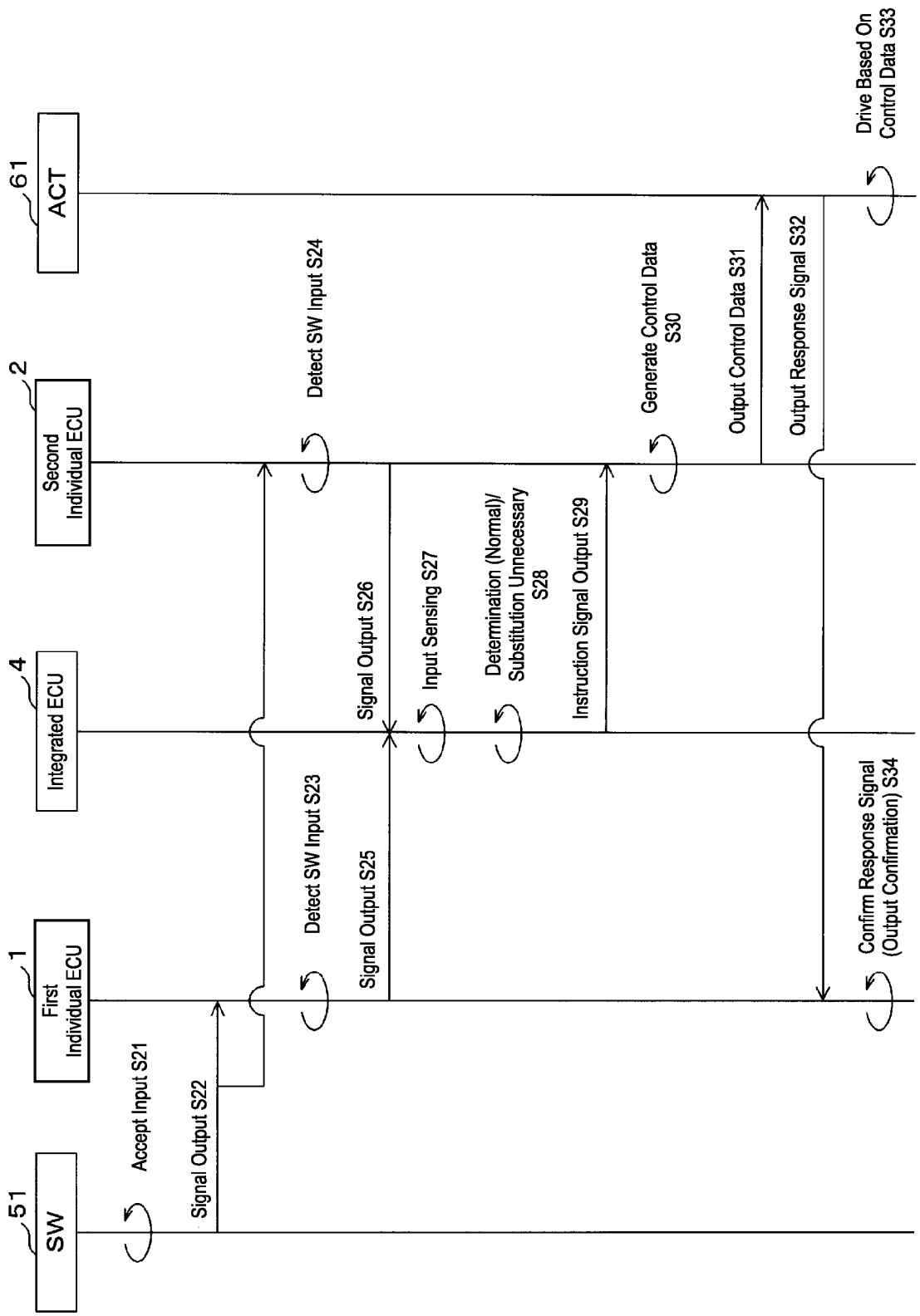
FIG. 8 is a descriptive diagram illustrating an example of one form of each of processes performed by the first individual ECU and the like (under normal conditions).

FIG. 8 is a descriptive diagram illustrating an example of one form of each of processes performed by the first individual ECU 1 and the like (under normal conditions). Similar to the first embodiment, in the present embodiment, the first individual ECU 1 functions as a SW input main ECU and an ACT output sub ECU. The second individual ECU 2 functions as an ACT output sub ECU and a SW input sub ECU. Based on results of communicating with the first individual ECU 1 and the second individual ECU 2, the integrated ECU 4 determines whether the first individual ECU 1 and the second individual ECU 2 are normal or are malfunctioning, and based on a result of the determination, performs processing for instructing the normal individual ECU to substitute for the malfunctioning individual ECU.

A flow of processing when both the first individual ECU 1 and the second individual ECU 2 are normal in the present embodiment will be described with reference to the drawings. Similar to the first embodiment, the switch 51 accepts an input from an operation (S21), and outputs the generated signal (the SW input signal) to the first individual ECU 1 and the second individual ECU 2 over the signal lines 8 (S22).

Similar to the first embodiment, the first individual ECU 1 and the second individual ECU 2 detect the signal output from the switch 51 (the SW input signal) (S23, S24). Based on the signal sensed from the switch 51 (the SW input signal), the first individual ECU 1 and the second individual ECU 2 generate signals (sensing signals) and output the sensing signals to the integrated ECU 4 (S25, S26).

The integrated ECU 4 senses the input of the signals output from the first individual ECU 1 and the second individual ECU 2 (the sensing signals) (S27). By sensing the input of the signals output from the first individual ECU 1 and the second individual ECU 2 (the sensing signals), the integrated ECU 4 obtains information about the signal output from the switch 51 (the SW input signal) through the first individual ECU 1 and the second individual ECU 2.

Based on the sensing of the input of the signals output from the first individual ECU 1 and the second individual ECU 2 (the sensing signals), the integrated ECU 4 determines that the first individual ECU 1 and the second individual ECU 2 are normal and that substitution is necessary for neither (S28). The integrated ECU 4 generates an instruction signal and outputs the generated instruction signal to the second individual ECU 2 (S29).

Based on the instruction signal obtained from the integrated ECU 4, the second individual ECU 2 generates control data, similar to the first embodiment (S30), and outputs the generated control data to the actuator 61 (S31).

Similar to the first embodiment, the actuator 61 generates a response signal, and outputs the generated response signal to the first individual ECU 1 (S32). Based on the control data output from the second individual ECU 2, the actuator 61 drives its own device (S33). The first individual ECU 1 confirms the response signal output from the actuator 61 (output confirmation) (S34).

Figure 9:
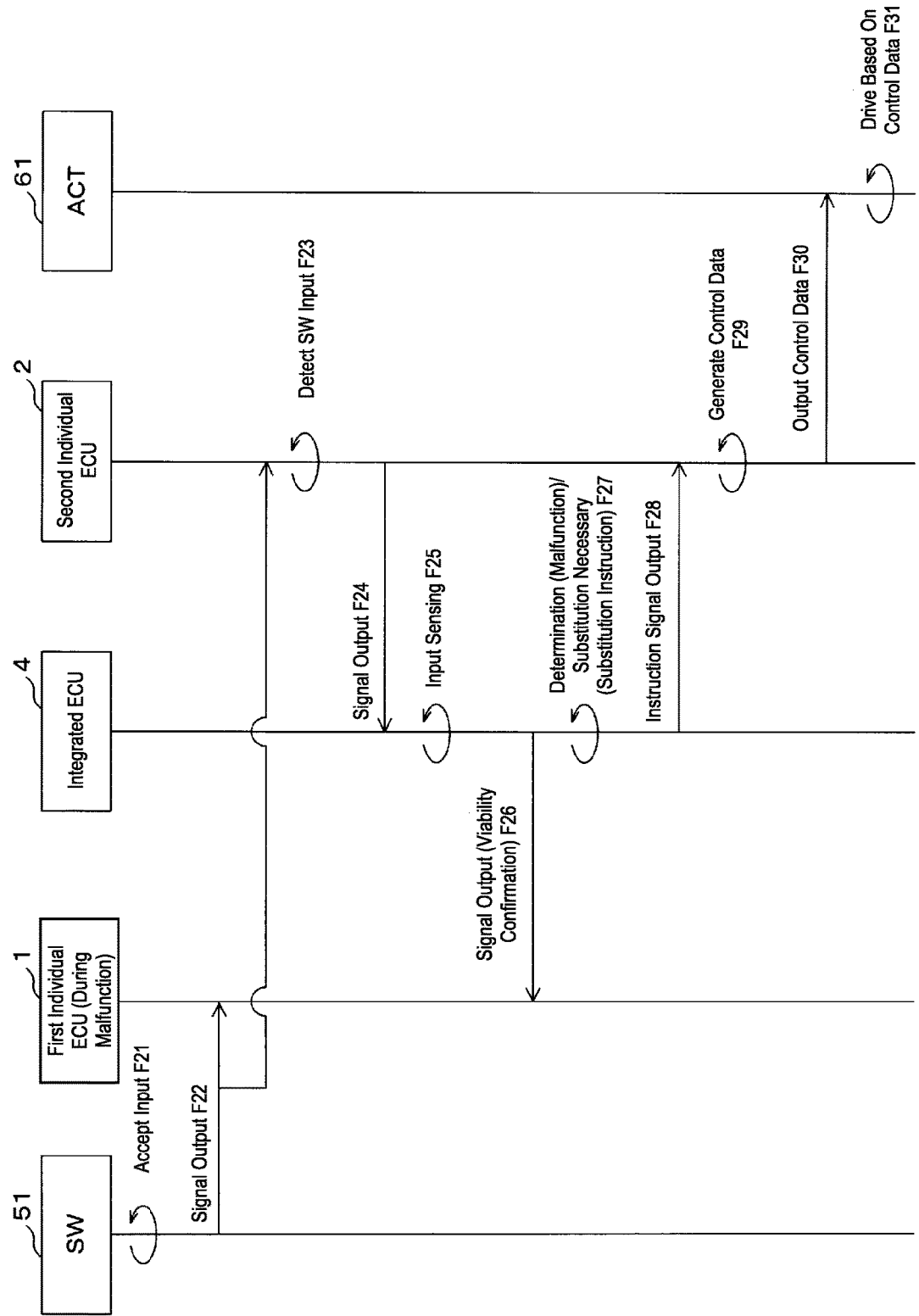
FIG. 9 is a descriptive diagram illustrating an example of one form of each of processes performed by the first individual ECU and the like (during first individual ECU malfunction).

FIG. 9 is a descriptive diagram illustrating an example of one form of each of processes performed by the first individual ECU 1 and the like (when the first individual ECU 1 is malfunctioning). A flow of processing when the first individual ECU 1 is malfunctioning and the second individual ECU 2 is normal in the present embodiment will be described with reference to the drawings.

Similar to the first embodiment, the switch 51 accepts an input from an operation (F21), and outputs the generated signal (the SW input signal) to the first individual ECU 1 and the second individual ECU 2 over the signal lines 8 (F22).

The second individual ECU 2 detects the signal output from the switch 51 (the SW input signal) (F23). Because the first individual ECU 1 is malfunctioning, the signal output from the switch 51 (the SW input signal) cannot be detected. Based on the signal sensed from the switch 51 (the SW input signal), the second individual ECU 2 generates a signal (a sensing signal) and outputs the sensing signal to the integrated ECU 4 (F24).

The integrated ECU 4 senses the input of the signal output from the second individual ECU 2 (the sensing signal) (F25). The integrated ECU 4 attempts to sense the input of the signal which should be output from the first individual ECU 1 (the sensing signal), but because the first individual ECU 1 is malfunctioning, the signal from the first individual ECU 1 (the sensing signal) cannot be detected.

Based on the fact that the signal from the first individual ECU 1 (the sensing signal) could not be successfully detected, the integrated ECU 4 outputs a signal for confirming viability (the viability confirmation signal) to the first individual ECU 1 (F26). Because the first individual ECU 1 is malfunctioning, the integrated ECU 4 cannot obtain a response to the viability confirmation signal from the first individual ECU 1.

The integrated ECU 4 determines that the first individual ECU 1 is malfunctioning and substitution is necessary (F27). The integrated ECU 4 outputs a signal instructing the second individual ECU 2 to substitute for the functions of the first individual ECU 1 (a substitution instruction signal) (F28).

Based on the substitution instruction signal obtained from the integrated ECU 4, the second individual ECU 2 generates control data, similar to the first embodiment (F29), and outputs the generated control data to the actuator 61 (F30). Based on the control data output from the second individual ECU 2, the actuator 61 drives its own device (F31).

Figure 10:
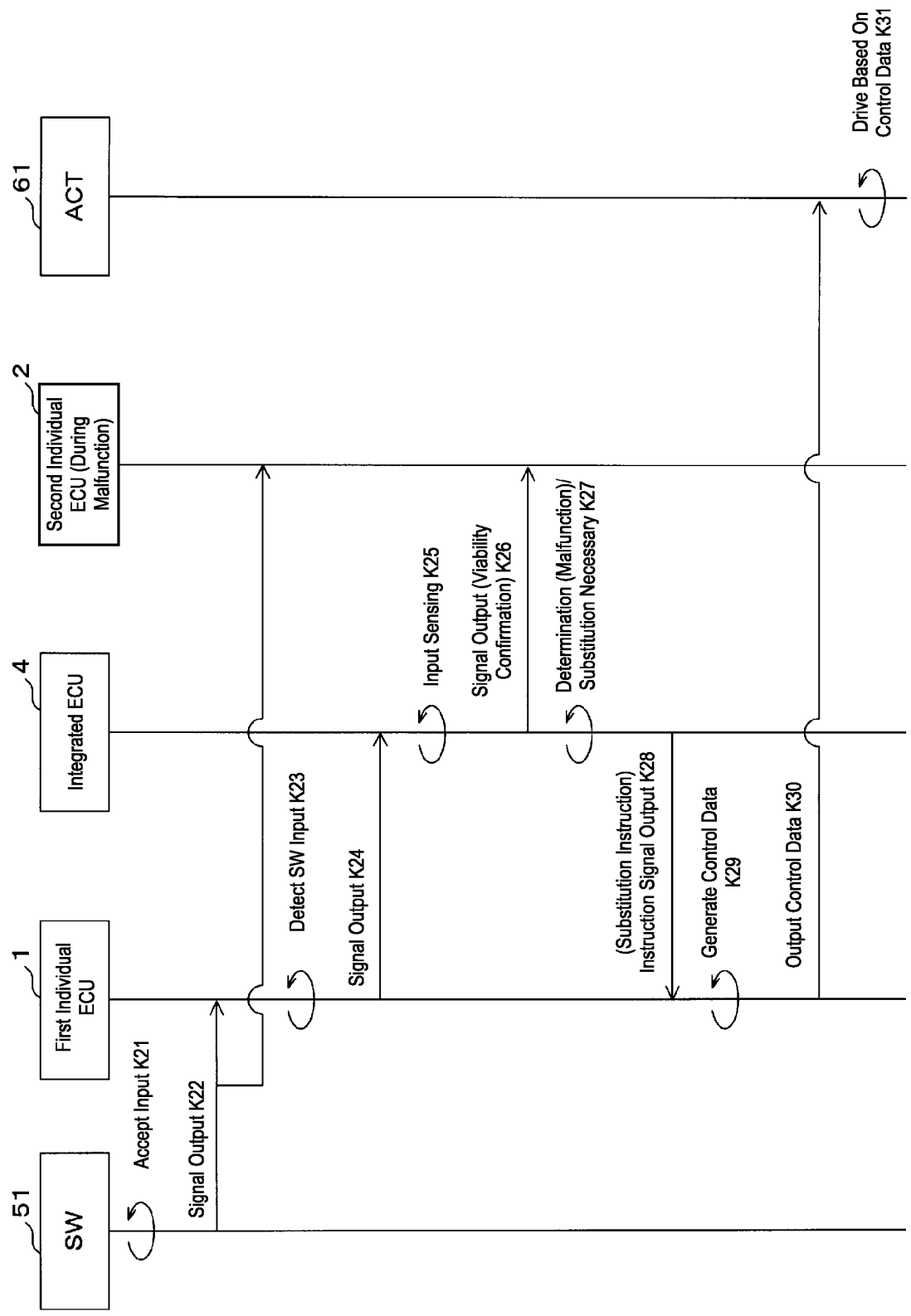
FIG. 10 is a descriptive diagram illustrating an example of one form of each of processes performed by the first individual ECU and the like (during second individual ECU malfunction).

FIG. 10 is a descriptive diagram illustrating an example of one form of each of processes performed by the first individual ECU 1 and the like (when the second individual ECU 2 is malfunctioning). A flow of processing when the first individual ECU 1 is normal and the second individual ECU 2 is malfunctioning in the present embodiment will be described with reference to the drawings.

Similar to the first embodiment, the switch 51 accepts an input from an operation (K21), and outputs the generated signal (the SW input signal) to the first individual ECU 1 and the second individual ECU 2 over the signal lines 8 (K22).

The first individual ECU 1 detects the signal output from the switch 51 (the SW input signal) (K23). Because the second individual ECU 2 is malfunctioning, the signal output from the switch 51 (the SW input signal) cannot be detected. Based on the signal sensed from the switch 51 (the SW input signal), the first individual ECU 1 generates a signal (a sensing signal) and outputs the sensing signal to the integrated ECU 4 (K24).

The integrated ECU 4 senses the input of the signal output from the first individual ECU 1 (the sensing signal) (K25). The integrated ECU 4 attempts to sense the input of the signal which should be output from the second individual ECU 2 (the sensing signal), but because the second individual ECU 2 is malfunctioning, the signal from the second individual ECU 2 (the sensing signal) cannot be detected.

Based on the fact that the signal from the second individual ECU 2 (the sensing signal) could not be successfully detected, the integrated ECU 4 outputs a signal for confirming viability (the viability confirmation signal) to the second individual ECU 2 (K26). Because the second individual ECU 2 is malfunctioning, the integrated ECU 4 cannot obtain a response to the viability confirmation signal from the second individual ECU 2.

The integrated ECU 4 determines that the second individual ECU 2 is malfunctioning and substitution is necessary (K27). The integrated ECU 4 outputs a signal instructing the first individual ECU 1 to substitute for the functions of the second individual ECU 2 (a substitution instruction signal) (K28).

Based on the substitution instruction signal obtained from the integrated ECU 4, the first individual ECU 1 generates control data, similar to the first embodiment (K29), and outputs the generated control data to the actuator 61 (K30). Based on the control data output from the first individual ECU 1, the actuator 61 drives its own device (K31).

Figure 11:
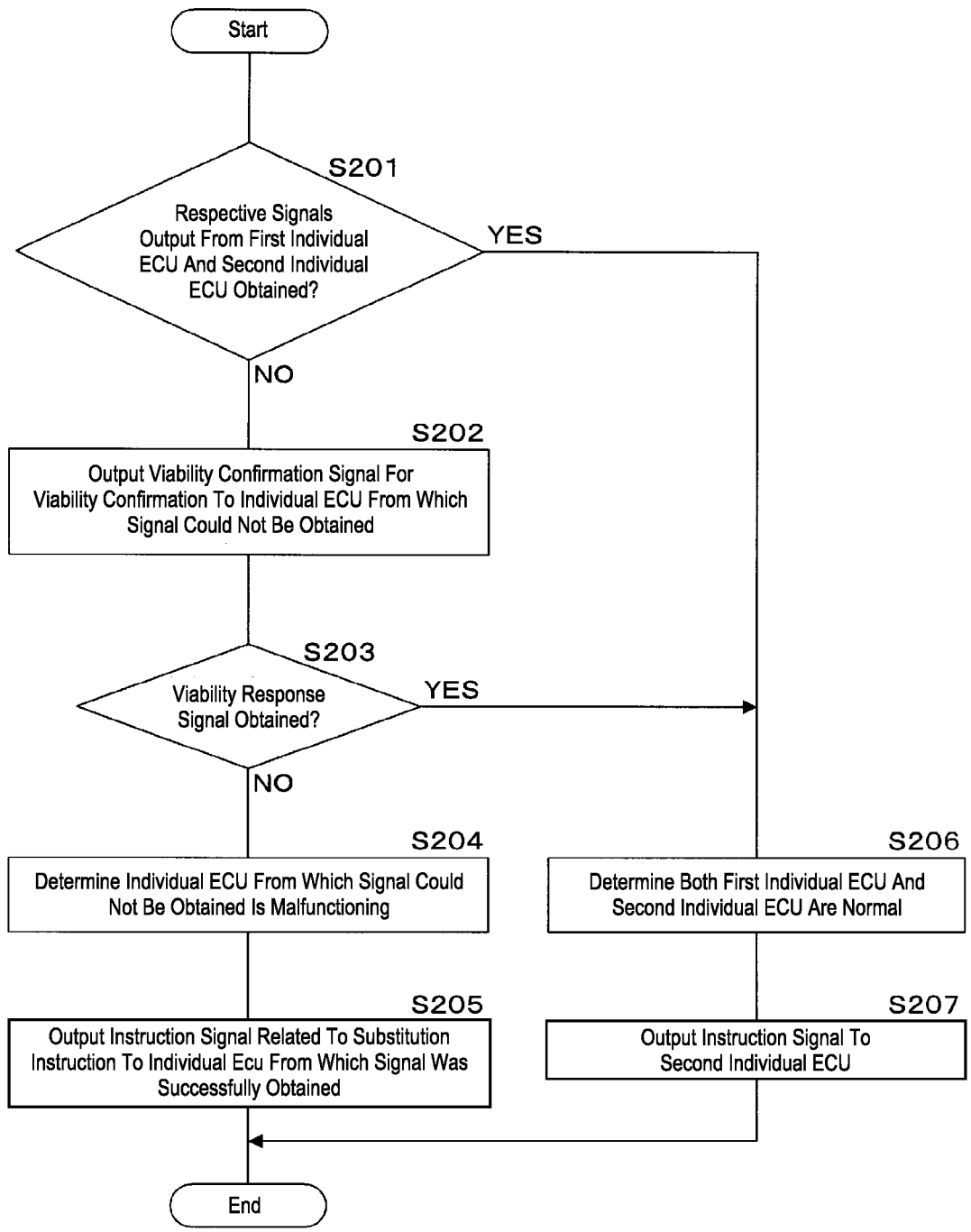
FIG. 11 is a flowchart illustrating an example of processing performed by a control unit of the integrated ECU.

FIG. 11 is a flowchart illustrating an example of processing performed by the control unit 41 of the integrated ECU 4. The control unit 41 of the integrated ECU 4 performs the following processing regularly while, for example, the vehicle C is in a started state (the ignition switch is on) or in a stopped state (the ignition switch is off).

The control unit 41 of the integrated ECU 4 determines whether the respective signals output from the first individual ECU 1 and the second individual ECU 2 have been obtained (S201). Based on the reception of the respective signals output from the first individual ECU 1 and the second individual ECU 2, i.e., the result of sensing the inputs of those signals, the control unit 41 of the integrated ECU 4 determines whether the respective signals output from the first individual ECU 1 and the second individual ECU 2 have been obtained.

If the respective signals output from the first individual ECU 1 and the second individual ECU 2 have been obtained (S201: YES), the control unit 41 of the integrated ECU 4 determines that both the first individual ECU 1 and the second individual ECU 2 are normal (S206). The control unit 41 of the integrated ECU 4 outputs an instruction signal to the second individual ECU 2 (S207).

Based on the instruction signal output from the control unit 41 of the integrated ECU 4 (a control data generation instruction signal), the second individual ECU 2 generates control data, similar to the first embodiment, and outputs the generated control data to the actuator 61. Based on the control data output from the second individual ECU 2, the actuator 61, which is the second in-vehicle device 6, drives its own device.

If the respective signals output from the first individual ECU 1 and the second individual ECU 2 have not been obtained (S201: NO), i.e., if the signal from either one of the first individual ECU 1 and the second individual ECU 2 could not be successfully obtained, the control unit 41 of the integrated ECU 4 outputs a viability confirmation signal, for confirming viability, to the individual ECU from which the signal could not be successfully obtained (S202).

The control unit 41 of the integrated ECU 4 determines whether a viability response signal has been obtained in response to the output viability confirmation signal (S203). If the viability response signal has been obtained (S203: YES), the control unit 41 of the integrated ECU 4 determines that both the first individual ECU 1 and the second individual ECU 2 are normal (S206).

If the viability response signal has not been obtained (S203: NO), the control unit 41 of the integrated ECU 4 determines that the individual ECU that could not successfully obtain the signal is malfunctioning (S204). The control unit 41 of the integrated ECU 4 outputs an instruction signal pertaining to a substitution instruction to the individual ECU that successfully obtained the signal (S205). The individual ECU that obtains the instruction signal pertaining to the substitution instruction performs processing for substituting for the individual ECU determined to be malfunctioning.

If the first individual ECU 1 is determined to be malfunctioning, the second individual ECU 2 performs processing pertaining to receiving the signal output from the switch 51, which is the processing performed by the first individual ECU 1, as a substitute, generates control data based on that signal, and outputs the generated control data to the actuator 61. If the second individual ECU 2 is determined to be malfunctioning, the first individual ECU 1 performs processing pertaining to the generation of the control data and the output of the control data to the actuator 61, which is the processing performed by the second individual ECU 2, as a substitute, based on the signal output from the switch 51.

According to the present embodiment, the integrated ECU 4, which is connected to the first individual ECU 1 and the second individual ECU 2 by the communication lines 7, determines whether the first individual ECU 1 and the second individual ECU 2 are normal or are malfunctioning based on a result of communication between the first individual ECU 1 and the second individual ECU 2. Accordingly, it can be made unnecessary for the first individual ECU 1 and the second individual ECU 2 to handle that determination processing. Accordingly, the load of the series of processes involving both the first in-vehicle device 5 and the second in-vehicle device 6 can be distributed by the first individual ECU 1, the second individual ECU 2, and the integrated ECU 4, and the availability of the in-vehicle system S can be improved.

Third Embodiment

Figure 12:
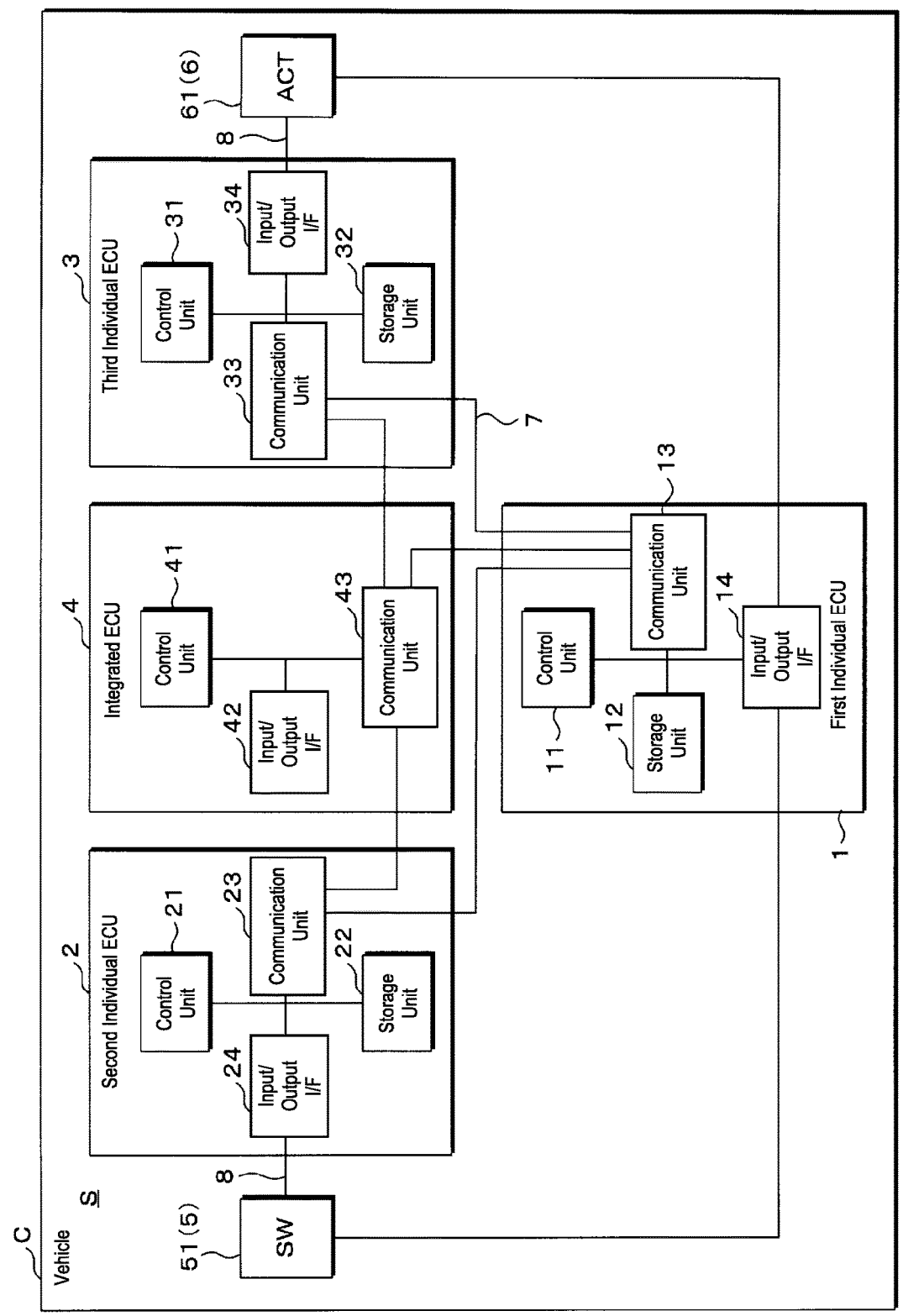
FIG. 12 is a schematic diagram illustrating an example of the configuration of an in-vehicle system according to a third embodiment (a third individual ECU).

FIG. 12 is a schematic diagram illustrating an example of the configuration of the in-vehicle system S according to a third embodiment (a third individual ECU 3). The in-vehicle system S includes the first individual ECU 1, the second individual ECU 2, the third individual ECU 3, and the integrated ECU 4, which are installed in the vehicle C.

The first individual ECU 1 and the second individual ECU 2 are communicably connected to the switch 51, which is the first in-vehicle device 5, by the signal lines 8. The first individual ECU 1 and the third individual ECU 3 are communicably connected to the actuator 61, which is the second in-vehicle device 6, by the signal lines 8.

The first individual ECU 1, the second individual ECU 2, and the third individual ECU 3 are connected by the communication lines 7 through the integrated ECU 4. Accordingly, the integrated ECU 4 is directly connected to the first individual ECU 1, the second individual ECU 2, and the third individual ECU 3 by three communication lines 7, which configures an in-vehicle network having a star-shaped topology centered on the integrated ECU 4. The integrated ECU 4 is connected only to the first individual ECU 1, the second individual ECU 2, and the third individual ECU 3, and is not directly connected to the first in-vehicle device 5 and the second in-vehicle device 6 by the signal lines 8.

Similar to the first individual ECU 1, the third individual ECU 3 includes a control unit 31, a storage unit 32, an input/output I/F 34, and a communication unit 33. The control unit 31, the storage unit 32, the input/output I/F 34, and the communication unit 33 of the third individual ECU 3 have configurations similar to those of the first individual ECU 1. Control programs and data stored in the storage unit 32 of the third individual ECU 3 are the same as, or are compatible with, the control programs and data stored in the storage unit 12 of the first individual ECU 1. If the first individual ECU 1 and the third individual ECU 3 have the same or mutually-compatible hardware configurations and software configurations in this manner, even if the first individual ECU 1 malfunctions, the third individual ECU 3 can, as a substitute, perform the functions to be executed by the first individual ECU 1 which is malfunctioning.

Figure 13:
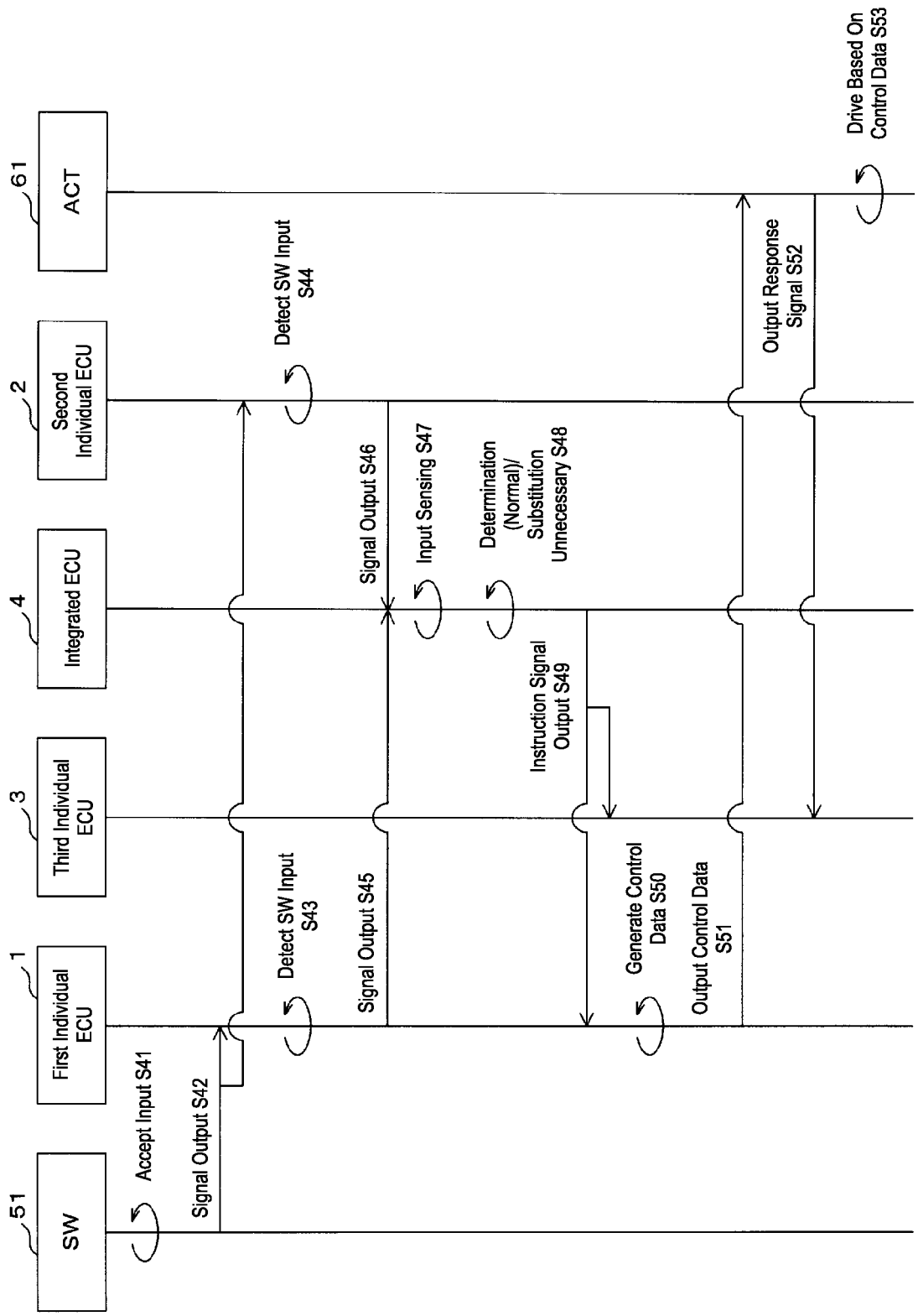
FIG. 13 is a descriptive diagram illustrating an example of one form of each of processes performed by the first individual ECU and the like (under normal conditions).

FIG. 13 is a descriptive diagram illustrating an example of one form of each of processes performed by the first individual ECU 1 and the like (under normal conditions). In the present embodiment, the first individual ECU 1 functions as a SW input main ECU that mainly performs processing on signals received from the switch 51, which is the first in-vehicle device 5, or in other words, processing corresponding to the input signal from the switch 51 (a SW input signal). The first individual ECU 1 further functions as an ACT output main ECU that mainly generates and outputs control data for the actuator 61, which is the second in-vehicle device 6, or in other words, performs processing corresponding to control data output to the actuator 61 (ACT output). In other words, the first individual ECU 1 functions as a SW input main ECU and an ACT output main ECU. On top of this, if the first individual ECU 1 is malfunctioning, the second individual ECU 2 functions as a SW input sub ECU that, as a substitute, performs the processing corresponding to the input signal from the switch 51 (the SW input). If the first individual ECU 1 is malfunctioning, the third individual ECU 3 functions as an ACT output sub ECU that, as a substitute, performs the processing corresponding to the output of control data to the actuator 61 (the ACT output).

Based on results of communicating with the first individual ECU 1 and the second individual ECU 2, the integrated ECU 4 determines whether the first individual ECU 1 is normal or is malfunctioning, and based on a result of that determination, performs processing for instructing the third individual ECU 3 to substitute for the first individual ECU 1.

A flow of processing when both the first individual ECU 1 and the second individual ECU 2 are normal in the present embodiment will be described with reference to the drawings. Similar to the first embodiment, the switch 51 accepts an input from an operation (S41), and outputs the generated signal (the SW input signal) to the first individual ECU 1 and the second individual ECU 2 over the signal lines 8 (S42).

Similar to the first embodiment, the first individual ECU 1 and the second individual ECU 2 detect the signal output from the switch 51 (the SW input signal) (S43, S44). Based on the signal sensed from the switch 51 (the SW input signal), the first individual ECU 1 and the second individual ECU 2 generate signals (sensing signals) and output the sensing signals to the integrated ECU 4 (S45, S46).

The integrated ECU 4 senses the input of the signals output from the first individual ECU 1 and the second individual ECU 2 (the sensing signals) (S47). By sensing the input of the signals output from the first individual ECU 1 and the second individual ECU 2 (the sensing signals), the integrated ECU 4 obtains information about the signal output from the switch 51 (the SW input signal) through the first individual ECU 1 and the second individual ECU 2.

Based on the sensing of the input of the signals output from the first individual ECU 1 and the second individual ECU 2 (the sensing signals), the integrated ECU 4 determines that the first individual ECU 1 and the second individual ECU 2 are normal and substitution of the first individual ECU 1 is not necessary (S48). The integrated ECU 4 generates an instruction signal and outputs the generated instruction signal to the first individual ECU 1 and the third individual ECU 3 (S49).

Based on the instruction signal obtained from the integrated ECU 4, the first individual ECU 1 generates control data (S50) and outputs the generated control data to the actuator 61 (S51). Similar to the first embodiment, the actuator 61 generates a response signal, and outputs the generated response signal to the third individual ECU 3 (S52). Based on the control data output from the first individual ECU 1, the actuator 61 drives its own device (S53).

Figure 14:
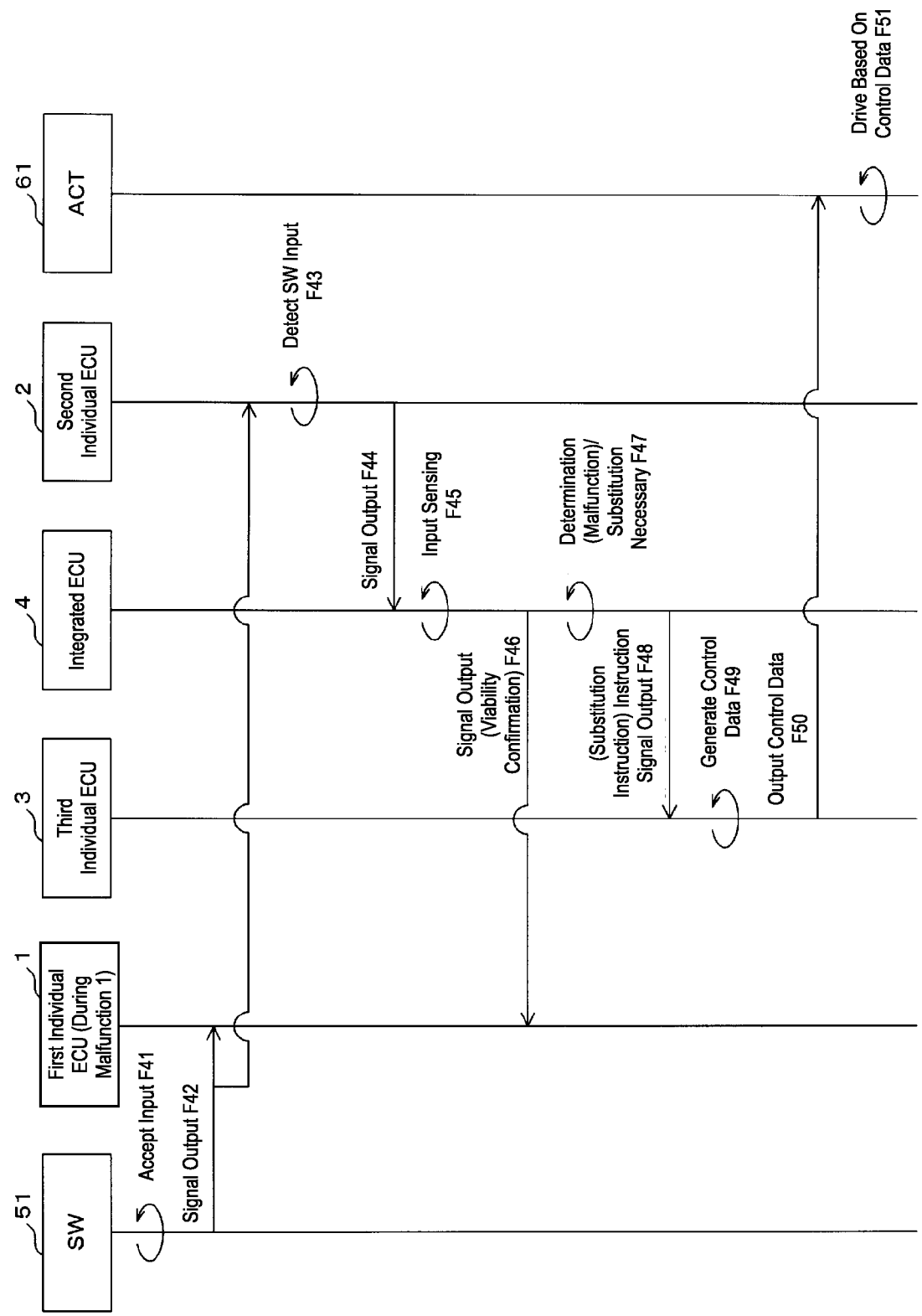
FIG. 14 is a descriptive diagram illustrating an example of one form of each of processes performed by the first individual ECU and the like (during first individual ECU malfunction 1).

FIG. 14 is a descriptive diagram illustrating an example of one form of each of processes performed by the first individual ECU 1 and the like (during first individual ECU 1 malfunction 1). A flow of processing when the first individual ECU 1 is malfunctioning, and the second individual ECU 2 and the third individual ECU 3 are normal, in the present embodiment will be described with reference to the drawings.

Similar to the first embodiment, the switch 51 accepts an input from an operation (F41), and outputs the generated signal (the SW input signal) to the first individual ECU 1 and the second individual ECU 2 over the signal lines 8 (F42).

The second individual ECU 2 detects the signal output from the switch 51 (the SW input signal) (F43). Because the first individual ECU 1 is malfunctioning, the signal output from the switch 51 (the SW input signal) cannot be detected. Based on the signal sensed from the switch 51 (the SW input signal), the second individual ECU 2 generates a signal (a sensing signal) and outputs the sensing signal to the integrated ECU 4 (F44).

The integrated ECU 4 senses the input of the signal output from the second individual ECU 2 (the sensing signal) (F45). The integrated ECU 4 attempts to sense the input of the signal which should be output from the first individual ECU 1 (the sensing signal), but because the first individual ECU 1 is malfunctioning, the signal from the first individual ECU 1 (the sensing signal) cannot be detected. Based on the fact that the signal from the first individual ECU 1 (the sensing signal) could not be successfully detected, the integrated ECU 4 outputs a signal for confirming viability (the viability confirmation signal) to the first individual ECU 1 (F46). Because the first individual ECU 1 is malfunctioning, the integrated ECU 4 cannot obtain a response to the viability confirmation signal from the first individual ECU 1.

The integrated ECU 4 determines that the first individual ECU 1 is malfunctioning and substitution is necessary (F47). The integrated ECU 4 outputs a signal instructing the third individual ECU 3 to substitute for the functions of the first individual ECU 1 (a substitution instruction signal) (F48).

Based on the substitution instruction signal obtained from the integrated ECU 4, the third individual ECU 3 generates control data (F49) and outputs the generated control data to the actuator 61 (F50). Based on the control data output from the third individual ECU 3, the actuator 61 drives its own device (F51).

Figure 15:
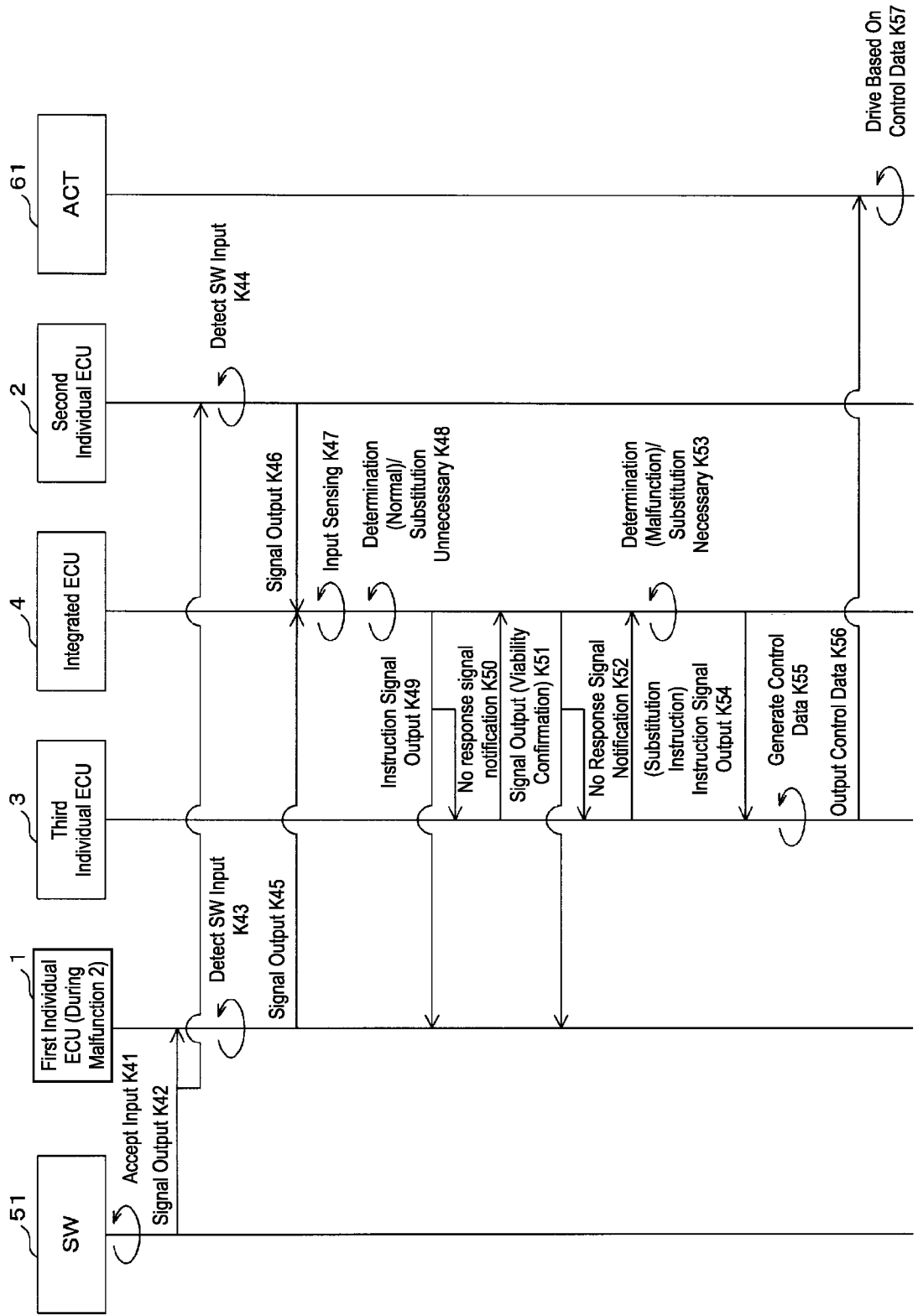
FIG. 15 is a descriptive diagram illustrating an example of one form of each of processes performed by the first individual ECU and the like (during first individual ECU malfunction 2).

FIG. 15 is a descriptive diagram illustrating an example of one form of each of processes performed by the first individual ECU 1 and the like (during first individual ECU 1 malfunction 2). A flow of processing when the first individual ECU 1 is malfunctioning, and the second individual ECU 2 and the third individual ECU 3 are normal, in the present embodiment will be described with reference to the drawings.

Similar to the first embodiment, the switch 51 accepts an input from an operation (K41), and outputs the generated signal (the SW input signal) to the first individual ECU 1 and the second individual ECU 2 over the signal lines 8 (K42).

Similar to the first embodiment, the first individual ECU 1 and the second individual ECU 2 detect the signal output from the switch 51 (the SW input signal) (K43, K44). Based on the signal sensed from the switch 51 (the SW input signal), the first individual ECU 1 and the second individual ECU 2 generate signals (sensing signals) and output the sensing signals to the integrated ECU 4 (K45, K46). In other words, at the point in time when the signal output from the switch 51 (the SW input signal) is detected, the first individual ECU 1 is functioning normally, and is operating normally as the SW input main ECU.

The integrated ECU 4 senses the input of the signals output from the first individual ECU 1 and the second individual ECU 2 (the sensing signals) (K47). Based on the sensing of the input of the signals output from the first individual ECU 1 and the second individual ECU 2 (the sensing signals), the integrated ECU 4 determines that the first individual ECU 1 and the second individual ECU 2 are normal and substitution of the first individual ECU 1 is not necessary (K48). In other words, at the point in time when the signal output from the switch 51 (the SW input signal) is detected, the integrated ECU 4 makes a primary determination that the first individual ECU 1 is normal.

The integrated ECU 4 generates an instruction signal and outputs the generated instruction signal to the first individual ECU 1 and the third individual ECU 3 (K49). However, based on the instruction signal output from the integrated ECU 4, the first individual ECU 1 is malfunctioning at the point in time when the control data is generated. Accordingly, the first individual ECU 1 cannot generate control data and output the control data to the actuator 61 based on the instruction signal output from the integrated ECU 4.

The third individual ECU 3 outputs, to the integrated ECU 4, a notification indicating that the response signal which should be output from the actuator 61 cannot be obtained (a no response signal notification) (K50). If a response signal has not been successfully obtained within a predetermined period from the point in time when the instruction signal was output from the integrated ECU 4, the third individual ECU 3 outputs a notification indicating that the response signal cannot be obtained (the no response signal notification) to the integrated ECU 4.

Based on the notification from the third individual ECU 3 (the no response signal notification), the integrated ECU 4 outputs a signal for confirming the viability of the first individual ECU 1 (the viability confirmation signal) to the first individual ECU 1 and the third individual ECU 3 (K51). Because the first individual ECU 1 is malfunctioning, the integrated ECU 4 cannot obtain a response to the viability confirmation signal from the first individual ECU 1.

If a response signal from the actuator 61 has not been successfully obtained within a predetermined period from the point in time when the viability confirmation signal was output from the integrated ECU 4, the third individual ECU 3 may further output a notification indicating that the response signal cannot be obtained (the no response signal notification) to the integrated ECU 4 again (K52).

Based on a response to the viability confirmation signal from the first individual ECU 1 not being able to be obtained, or based on the obtainment of the repeated no response signal notification from the third individual ECU 3, the integrated ECU 4 determines that the first individual ECU 1 is malfunctioning and substitution is necessary (K53). In other words, based on the result of communication with the first individual ECU 1 or the third individual ECU 3, the integrated ECU 4 makes a final determination that the first individual ECU 1 is malfunctioning and substitution is necessary. The integrated ECU 4 outputs a signal instructing the third individual ECU 3 to substitute for the functions of the first individual ECU 1 (a substitution instruction signal) (K54).

Based on the substitution instruction signal obtained from the integrated ECU 4, the third individual ECU 3 generates control data (K55) and outputs the generated control data to the actuator 61 (K56). Based on the control data output from the third individual ECU 3, the actuator 61 drives its own device (F57).

Figure 16:
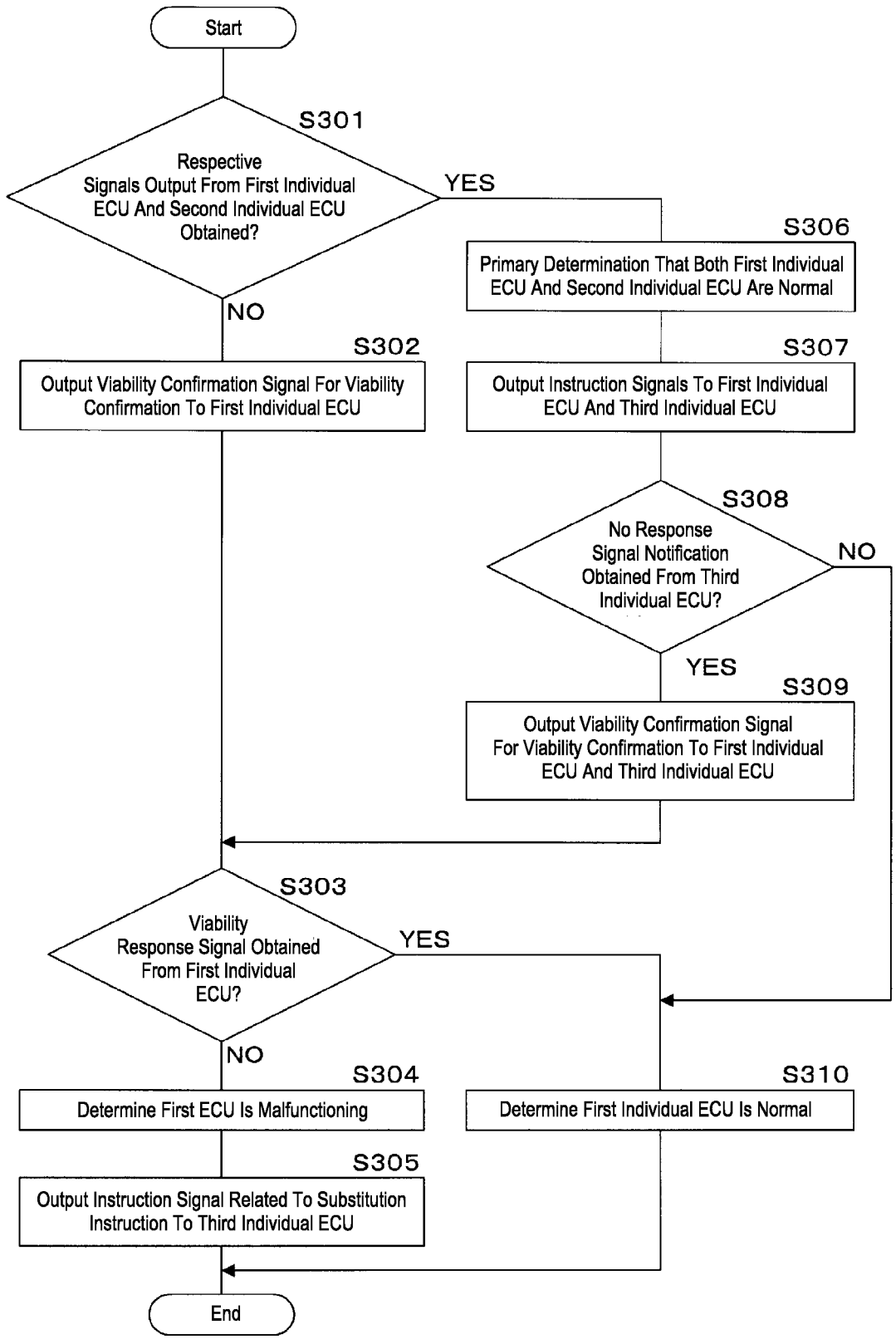
FIG. 16 is a flowchart illustrating an example of processing performed by the control unit of the integrated ECU.

FIG. 16 is a flowchart illustrating an example of processing performed by the control unit 41 of the integrated ECU 4. The control unit 41 of the integrated ECU 4 performs the following processing regularly while, for example, the vehicle C is in a started state (the ignition switch is on) or in a stopped state (the ignition switch is off).

The control unit 41 of the integrated ECU 4 determines whether the respective signals output from the first individual ECU 1 and the second individual ECU 2 have been obtained (S301). If the respective signals output from the first individual ECU 1 and the second individual ECU 2 have not been obtained (S301: NO), the viability confirmation signal for confirming viability is output to the first individual ECU 1 (S302).

The control unit 41 of the integrated ECU 4 determines whether the viability response signal has been obtained from the first individual ECU 1 (S303). If the viability response signal has been obtained from the first individual ECU 1 (S303: YES), the control unit 41 of the integrated ECU 4 determines that the first individual ECU 1 is normal (S310).

If the viability response signal has not been obtained from the first individual ECU 1 (S303: NO), the control unit 41 of the integrated ECU 4 determines that the first individual ECU 1 is malfunctioning (S304). The control unit 41 of the integrated ECU 4 outputs an instruction signal pertaining to a substitution instruction to the third individual ECU 3 (S305).

If the respective signals output from the first individual ECU 1 and the second individual ECU 2 have been obtained (S301: YES), the control unit 41 of the integrated ECU 4 makes a primary determination that both the first individual ECU 1 and the second individual ECU 2 are normal (S306). The control unit 41 of the integrated ECU 4 outputs an instruction signal to the first individual ECU 1 and the third individual ECU 3 (S307).

The control unit 41 of the integrated ECU 4 determines whether the no response signal notification has been obtained from the third individual ECU 3 (S308). If the no response signal notification has not been obtained (S308: NO), the control unit 41 of the integrated ECU 4 determines that the first individual ECU 1 is normal (S310).

If the no response signal notification has been obtained (S308: YES), the control unit 41 of the integrated ECU 4 outputs the viability confirmation signal for confirming viability to the first individual ECU 1 and the third individual ECU 3 (S309).

The control unit 41 of the integrated ECU 4 determines whether the viability response signal has been obtained from the first individual ECU 1 (S303). If the viability response signal has been obtained from the first individual ECU 1 (S303: YES), the control unit 41 of the integrated ECU 4 determines that the first individual ECU 1 is normal (S310).

If the viability response signal has not been obtained from the first individual ECU 1 (S303: NO), the control unit 41 of the integrated ECU 4 determines that the first individual ECU 1 is malfunctioning (S304). If the no response signal notification has been obtained from the third individual ECU 3 again, the control unit 41 of the integrated ECU 4 may make a final determination that the first individual ECU 1 is malfunctioning. If the third individual ECU 3 is standing by for the response signal output from the actuator 61, and that response signal is not obtained (received) within a predetermined period from the point in time when the viability confirmation signal is obtained from the control unit 41 of the integrated ECU 4, the third individual ECU 3 may output the no response signal notification to the integrated ECU 4 again. In this case, the control unit 41 of the integrated ECU 4 obtains the no response signal notification from the third individual ECU 3 again, and the control unit 41 of the integrated ECU 4 may determine that the first individual ECU 1 is malfunctioning based on that repeated no response signal notification. The control unit 41 of the integrated ECU 4 outputs an instruction signal pertaining to a substitution instruction to the third individual ECU 3 (S305).

According to the present embodiment, the in-vehicle system S uses the first individual ECU 1 as the main individual ECU that handles the processing for the first in-vehicle device 5 and the second in-vehicle device 6, and also includes the second individual ECU 2, which handles the processing for the first in-vehicle device 5 as a substitute, and the third individual ECU 3, which handles the processing for the second in-vehicle device 6 as a substitute. Accordingly, the reliability of the processing involving both the first in-vehicle device 5 and the second in-vehicle device 6 can be further improved.

Fourth Embodiment

Figure 17:
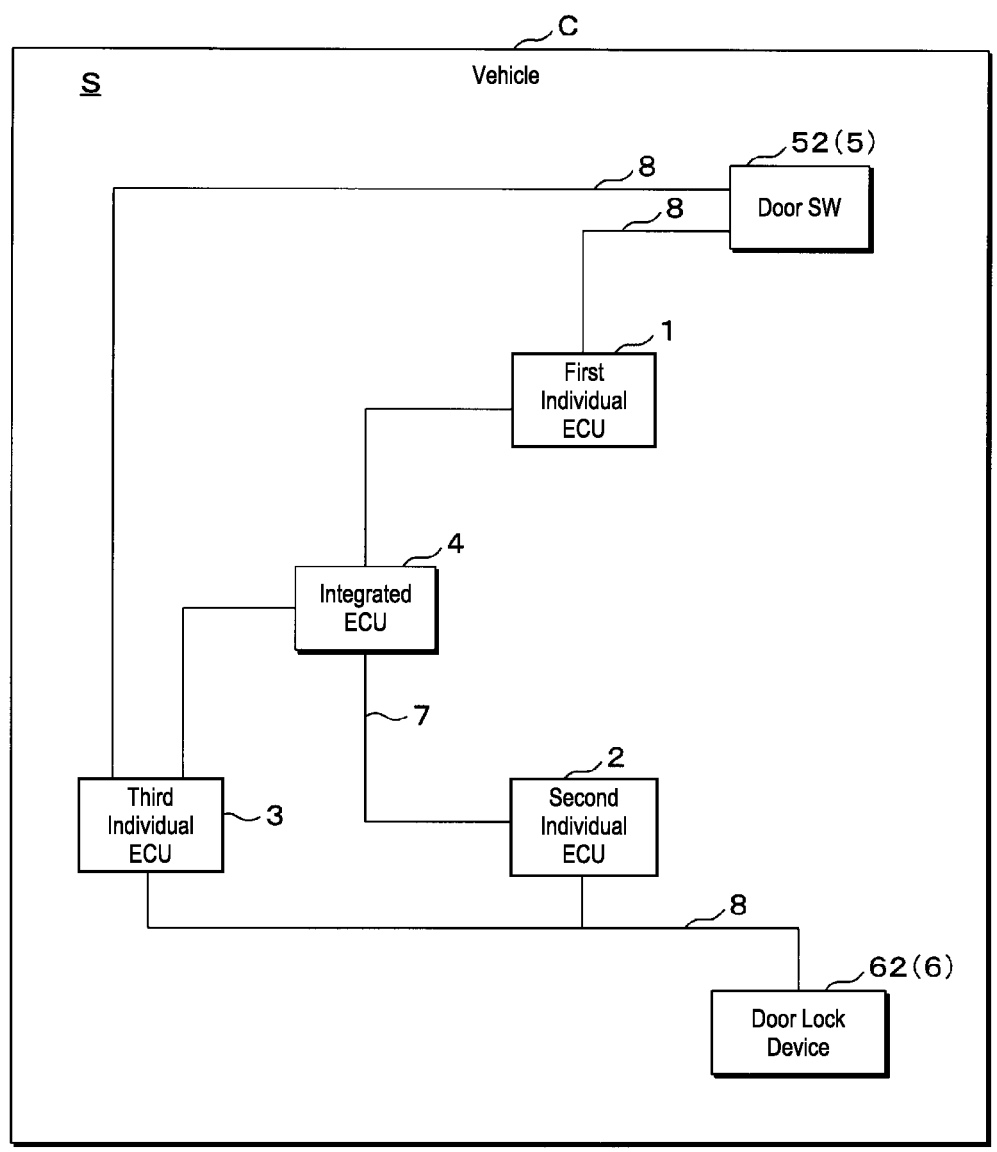
FIG. 17 is a schematic diagram illustrating an example of the configuration of an in-vehicle system according to a fourth embodiment (a door lock).

FIG. 17 is a schematic diagram illustrating an example of the configuration of the in-vehicle system S according to a fourth embodiment (a door lock). The in-vehicle system S includes the first individual ECU 1, the second individual ECU 2, the third individual ECU 3, and the integrated ECU 4, which are installed in the vehicle C. In the present embodiment, as one example, the first in-vehicle device 5 is the door SW 52, and the second in-vehicle device 6 is a door lock device 62.

The integrated ECU 4 is directly connected to the first individual ECU 1, the second individual ECU 2, and the third individual ECU 3 by three communication lines 7, which configures an in-vehicle network having a star shaped topology centered on the integrated ECU 4.

The first individual ECU 1 and the third individual ECU 3 are directly connected to the door SW 52 by the signal lines 8. The second individual ECU 2 and the third individual ECU 3 are directly connected to the door lock device 62 by the signal lines 8.

The first individual ECU 1 functions as a SW input main ECU that mainly performs processing on signals received from the door SW 52, which is the first in-vehicle device 5, or in other words, processing corresponding to the input signal from the door SW 52 (a SW input signal).

The second individual ECU 2 functions as an ACT output main ECU that mainly generates and outputs control data for the door lock device 62, which is the second in-vehicle device 6, or in other words, performs processing corresponding to control data output to the door lock device 62 (ACT output).

If the first individual ECU 1 is malfunctioning, the third individual ECU 3 functions as a SW input sub ECU that handles, as a substitute, the processing corresponding to the input signal from the door SW 52 (the SW input signal). Furthermore, if the second individual ECU 2 is malfunctioning, the third individual ECU 3 functions as an ACT output sub ECU that handles, as a substitute, the processing corresponding to the output of control data to the door lock device 62 (the ACT output).

Similar to the third embodiment, based on results of communicating with the first individual ECU 1 and the second individual ECU 2, the integrated ECU 4 determines whether the first individual ECU 1 is normal or is malfunctioning, and based on a result of that determination, performs processing for instructing the third individual ECU 3 to substitute for the first individual ECU 1 or the second individual ECU 2.

By doubling the connection structure of the signal lines 8, which connect the first individual ECU 1, the second individual ECU 2, and the third individual ECU 3 to the door SW 52 and the door lock device 62, in this manner, that connection structure can be given a redundant configuration. By having the integrated ECU 4 perform the processing pertaining to malfunction determinations and substitution instructions for these individual ECUs, the reliability of control processing involving both the door SW 52 and the door lock device 62 can be improved.

Fifth Embodiment

Figure 18:
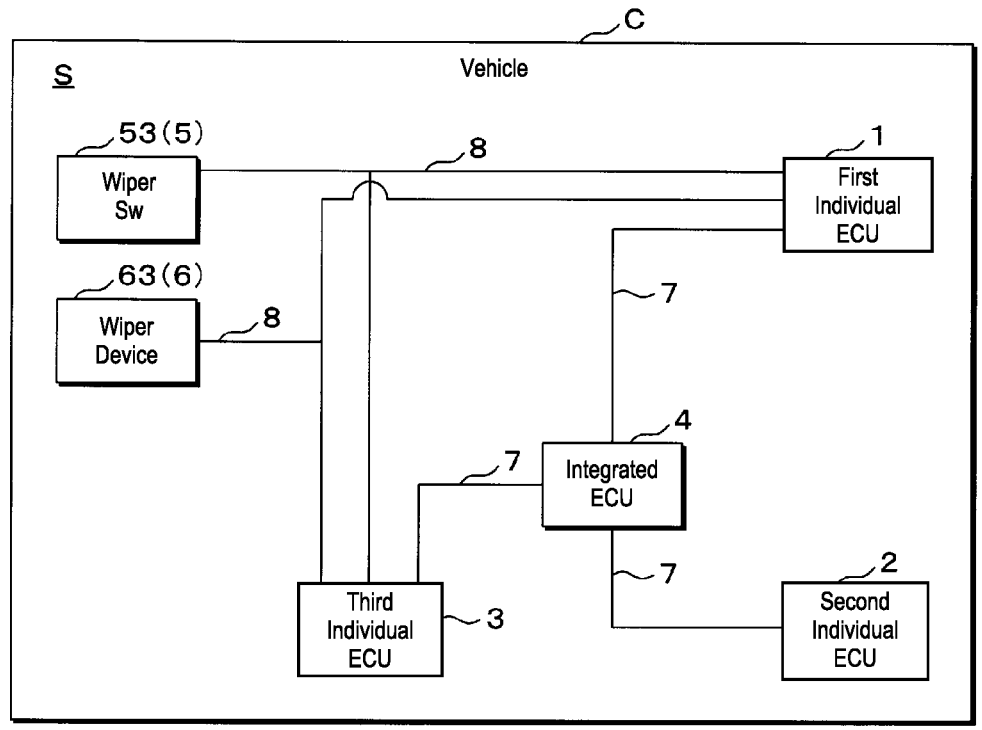
FIG. 18 is a schematic diagram illustrating an example of the configuration of an in-vehicle system according to a fifth embodiment (a wiper).

FIG. 18 is a schematic diagram illustrating an example of the configuration of the in-vehicle system S according to a fifth embodiment (a wiper). The in-vehicle system S includes the first individual ECU 1, the second individual ECU 2, the third individual ECU 3, and the integrated ECU 4, which are installed in the vehicle C. In the present embodiment, as one example, the first in-vehicle device 5 is a wiper SW 53, and the second in-vehicle device 6 is a wiper device 63.

The integrated ECU 4 is directly connected to the first individual ECU 1, the second individual ECU 2, and third individual ECU 3 by three communication lines 7, which configures an in-vehicle network having a star shaped topology centered on the integrated ECU 4. The first individual ECU 1 and the third individual ECU 3 are directly connected to the wiper SW 53 and the wiper device 63, respectively, by the signal lines 8.

The first individual ECU 1 functions as a SW input main ECU that mainly performs processing on signals received from the wiper SW 53, which is the first in-vehicle device 5, or in other words, processing corresponding to the input signal from the wiper SW 53 (a SW input signal). The first individual ECU 1 further functions as an ACT output main ECU that mainly generates and outputs control data for the wiper device 63, which is the second in-vehicle device 6, or in other words, performs processing corresponding to control data output to the wiper device 63 (ACT output).

If the first individual ECU 1 is malfunctioning, the third individual ECU 3 functions as a SW input sub ECU that handles, as a substitute, the processing corresponding to the input signal from the wiper SW 53 (the SW input signal). Furthermore, if the first individual ECU 1 is malfunctioning, the third individual ECU 3 functions as an ACT output sub ECU that handles, as a substitute, the processing corresponding to the output of control data to the wiper device 63 (the ACT output).

Similar to the third embodiment, based on results of communicating with the first individual ECU 1 and the third individual ECU 3, the integrated ECU 4 determines whether the first individual ECU 1 or the third individual ECU 3 is normal or is malfunctioning, and based on a result of that determination, performs processing for instructing the first individual ECU 1 or the third individual ECU 3 to substitute for the other individual ECU.

By doubling the connections of the signal lines 8, which connect the first individual ECU 1 and the third individual ECU 3 to the wiper SW 53 and the wiper device 63, in this manner, that connection structure can be given a redundant configuration. By having the integrated ECU 4 perform the processing pertaining to malfunction determinations and substitution instructions for these individual ECUs, the reliability of control processing involving both the wiper SW 53 and the wiper device 63 can be improved.

Sixth Embodiment

Figure 19:
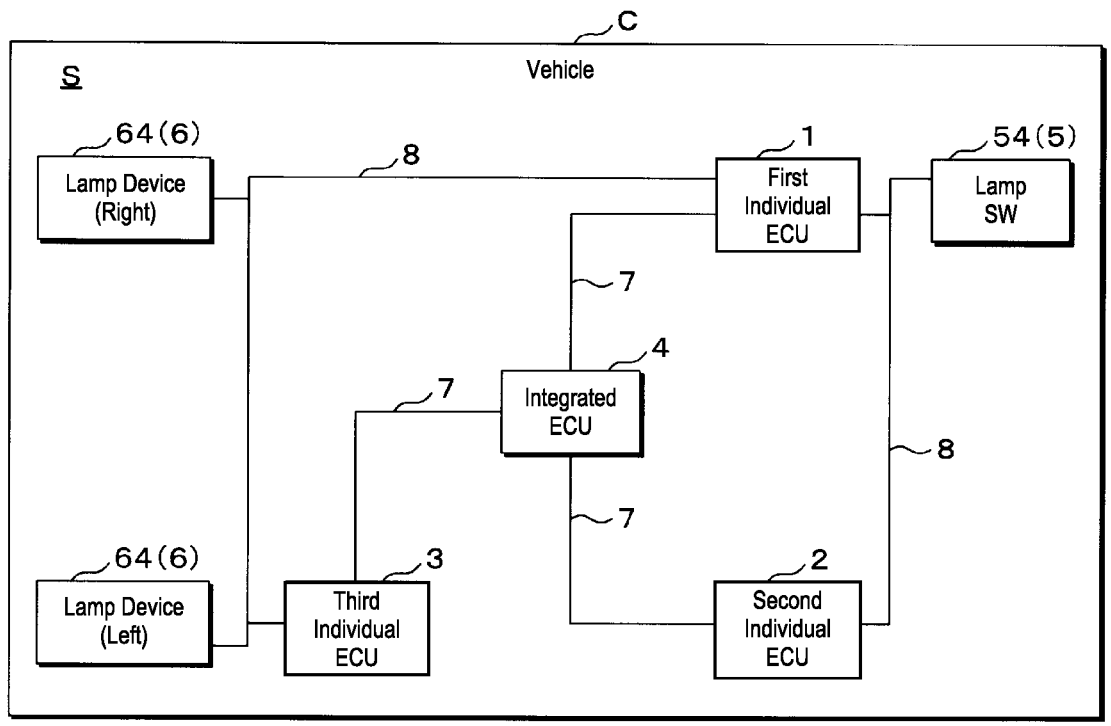
FIG. 19 is a schematic diagram illustrating an example of the configuration of an in-vehicle system according to a sixth embodiment (a lamp).

FIG. 19 is a schematic diagram illustrating an example of the configuration of the in-vehicle system S according to a sixth embodiment (a lamp). The in-vehicle system S includes the first individual ECU 1, the second individual ECU 2, the third individual ECU 3, and the integrated ECU 4, which are installed in the vehicle C. In the present embodiment, as one example, the first in-vehicle device 5 is a lamp SW 54, and the second in-vehicle device 6 is left and right lamp devices 64 located in a front part of the vehicle C.

The integrated ECU 4 is directly connected to the first individual ECU 1, the second individual ECU 2, and the third individual ECU 3 by three communication lines 7, which configures an in-vehicle network having a star-shaped topology centered on the integrated ECU 4.

The first individual ECU 1 and the second individual ECU 2 are directly connected to the lamp SW 54 by the signal lines 8. The first individual ECU 1 and the third individual ECU 3 are directly connected to the lamp devices 64 by the signal lines 8.

The first individual ECU 1 functions as a SW input main ECU that mainly performs processing on signals received from the lamp SW 54, which is the first in-vehicle device 5, or in other words, processing corresponding to the input signal from the lamp SW 54 (a SW input signal). The first individual ECU 1 further functions as an ACT output main ECU that mainly generates and outputs control data for the lamp devices 64, which is the second in-vehicle device 6, or in other words, performs processing corresponding to control data output to the lamp devices 64 (ACT output).

If the first individual ECU 1 is malfunctioning, the second individual ECU 2 functions as a SW input sub ECU that handles, as a substitute, the processing corresponding to the input signal from the lamp SW 54 (the SW input signal).

If the first individual ECU 1 is malfunctioning, the third individual ECU 3 functions as an ACT output sub ECU that handles, as a substitute, the processing corresponding to the output of control data to the lamp devices 64 (the ACT output).

Similar to the third embodiment, based on results of communicating with the first individual ECU 1, the integrated ECU 4 determines whether the first individual ECU 1 is normal or is malfunctioning, and based on a result of that determination, performs processing for instructing the second individual ECU 2 or the third individual ECU 3 to substitute for the first individual ECU 1.

By doubling the connection structure of the signal lines 8, which connect the first individual ECU 1, the second individual ECU 2, and the third individual ECU 3 to the lamp SW 54 and the lamp devices 64, in this manner, that connection structure can be given a redundant configuration. Furthermore, by having the integrated ECU 4 perform the processing pertaining to malfunction determinations and substitution instructions for these individual ECUs, the reliability of control processing involving both the lamp SW 54 and the lamp devices 64 can be improved.

The embodiments disclosed here are intended to be in all ways exemplary and in no ways limiting. The scope of the present invention is defined not by the foregoing descriptions but by the scope of the claims, and is intended to include all changes equivalent in meaning and scope of the claims.

The invention claimed is:

1. An in-vehicle system comprising:
    a first in-vehicle device installed in a vehicle;
    a second in-vehicle device controlled in accordance with a signal output from the first in-vehicle device;
    a first in-vehicle ECU communicably connected to the first in-vehicle device and the second in-vehicle device by signal lines; and
    a second in-vehicle ECU communicably connected to the first in-vehicle device and the second in-vehicle device by the signal lines,
    wherein the first in-vehicle ECU and the second in-vehicle ECU are connected by a communication line of a type different from a type of the signal lines, and
    a communication path including a first path and a second path independent of the first path, wherein the first in-vehicle ECU relays the first path from the first in-vehicle device to the second in-vehicle device, and the second in-vehicle ECU relays the second path from the first in-vehicle device to the second in-vehicle device so as to provide a redundant path for the signal output from the first in-vehicle device to the second in-vehicle device.

2. The in-vehicle system according to claim 1, wherein the first in-vehicle ECU and the second in-vehicle ECU each includes a control unit that obtains a signal from the first in-vehicle device over the signal line and generates control data for controlling the second in-vehicle device based on the signal output from the first in-vehicle device, each of the control units of the first in-vehicle ECU and the second in-vehicle ECU is configured to determine, based on a result of communication between the first in-vehicle ECU and the second in-vehicle ECU over the communication line, whether the other in-vehicle ECU is normal or is malfunctioning, when the first in-vehicle ECU is determined to be malfunctioning, the second in-vehicle ECU substitutes for the first in-vehicle ECU, and when the second in-vehicle ECU is determined to be malfunctioning, the first in-vehicle ECU substitutes for the second in-vehicle ECU.

3. The in-vehicle system according to claim 2, wherein the control unit of the second in-vehicle ECU is configured to substitute for the first in-vehicle ECU by outputting the control data to the second in-vehicle device through the second path when the control unit of the second in-vehicle ECU determines that the first in-vehicle ECU is malfunctioning, and the control unit of the first in-vehicle ECU is configured to substitute for the second in-vehicle ECU by outputting the control data to the second in-vehicle device through the first path when the control unit of the first in-vehicle ECU determines that the second in-vehicle ECU is malfunctioning.

4. The in-vehicle system according to claim 2, wherein when both the first in-vehicle ECU and the second in-vehicle ECU are determined to be normal, communication from the first in-vehicle device to the second in-vehicle device is performed via the first in-vehicle ECU and the second in-vehicle ECU.

5. The in-vehicle system according to claim 2, wherein the control unit of the second in-vehicle ECU is configured to, after obtaining the signal from the first in-vehicle device:
determine, when a signal output from the first in-vehicle ECU is not obtained within a predetermined period, that the first in-vehicle ECU is malfunctioning; and
determine, when the signal output from the first in-vehicle ECU is obtained within the predetermined period, that the first in-vehicle ECU is normal.

6. The in-vehicle system according to claim 2, wherein the control unit of the first in-vehicle ECU is configured to, after obtaining the signal from the first in-vehicle device:
determine, when a response from the second in-vehicle device is not obtained within a predetermined period, that the second in-vehicle ECU is malfunctioning; and
determine, when the response from the second in-vehicle device is obtained within the predetermined period, that the second in-vehicle ECU is normal.

7. The in-vehicle system according to claim 2, wherein the control unit of the first in-vehicle ECU is configured to:
further output, when a response to the signal is not obtained from the second in-vehicle device within a predetermined period, a confirmation signal to the second in-vehicle ECU over the communication line;
determine, when a response to the confirmation signal is not obtained from the second in-vehicle ECU, that the second in-vehicle ECU is malfunctioning; and
determine, when a response to the confirmation signal is obtained from the second in-vehicle ECU, that the second in-vehicle ECU is normal.

8. The in-vehicle system according to claim 1, further comprising:
a third in-vehicle ECU connected to the first in-vehicle ECU and the second in-vehicle ECU by communication lines, wherein a control unit of the third in-vehicle ECU is configured to determine, based on a result of communication with the first in-vehicle ECU and the second in-vehicle ECU over the communication lines, whether the first in-vehicle ECU and the second in-vehicle ECU are normal or are malfunctioning, when the first in-vehicle ECU is determined to be malfunctioning, the second in-vehicle ECU substitutes for the first in-vehicle ECU, and when the second in-vehicle ECU is determined to be malfunctioning, the first in-vehicle ECU substitutes for the second in-vehicle ECU.

9. The in-vehicle system according to claim 8, wherein the control unit of the third in-vehicle ECU is configured to determine whether the first in-vehicle ECU and the second in-vehicle ECU are normal or are malfunctioning based on a result of obtaining signal detection data output from the first in-vehicle ECU and the second in-vehicle ECU in accordance with a signal output by the first in-vehicle device.

10. The in-vehicle system according to claim 8,
wherein the third in-vehicle ECU is connected to the first in-vehicle device and the second in-vehicle device via the first in-vehicle ECU or the second in-vehicle ECU rather than being directly connected by the signal lines.

11. An in-vehicle ECU communicably connected along a first path of a communication path, by signal lines, to a first in-vehicle device and a second in-vehicle device installed in a vehicle, the in-vehicle ECU configured to relay the first path from the first in-vehicle device to the second in-vehicle device,
wherein the in-vehicle ECU is connected, by a communication line of a type different from a type of the signal lines, to another in-vehicle ECU communicably connected along a second path of the communication path to the first in-vehicle device and the second in-vehicle device by the signal lines, the other in-vehicle ECU configured to relay the second path from the first in-vehicle device to the second in-vehicle device,
the in-vehicle ECU comprises a control unit configured to obtain a signal from the first in-vehicle device over the signal line and generate control data for controlling the second in-vehicle device based on the signal output from the first in-vehicle device, and
the control unit is configured to:
determine whether the other in-vehicle ECU is normal or is malfunctioning based on a result of communication with the other in-vehicle ECU; and
when the other in-vehicle ECU is determined to be malfunctioning, perform processing substituting for the other in-vehicle ECU.

12. The in-vehicle system according to claim 3, wherein when both the first in-vehicle ECU and the second in-vehicle ECU are determined to be normal, communication from the first in-vehicle device to the second in-vehicle device is performed via the first in-vehicle ECU and the second in-vehicle ECU.

13. The in-vehicle system according to claim 3, wherein the control unit of the second in-vehicle ECU is configured to, after obtaining the signal from the first in-vehicle device:
determine, when a signal output from the first in-vehicle ECU is not obtained within a predetermined period, that the first in-vehicle ECU is malfunctioning; and
determine, when the signal output from the first in-vehicle ECU is obtained within the predetermined period, that the first in-vehicle ECU is normal.

14. The in-vehicle system according to claim 4, wherein the control unit of the second in-vehicle ECU is configured to, after obtaining the signal from the first in-vehicle device:
  determine, when a signal output from the first in-vehicle ECU is not obtained within a predetermined period, that the first in-vehicle ECU is malfunctioning; and
  determine, when the signal output from the first in-vehicle ECU is obtained within the predetermined period, that the first in-vehicle ECU is normal.

15. The in-vehicle system according to claim 3, wherein the control unit of the first in-vehicle ECU is configured to, after obtaining the signal from the first in-vehicle device:
  determine, when a response from the second in-vehicle device is not obtained within a predetermined period, that the second in-vehicle ECU is malfunctioning; and
  determine, when the response from the second in-vehicle device is obtained within the predetermined period, that the second in-vehicle ECU is normal.

16. The in-vehicle system according to claim 4, wherein the control unit of the first in-vehicle ECU is configured to, after obtaining the signal from the first in-vehicle device:
  determine, when a response from the second in-vehicle device is not obtained within a predetermined period, that the second in-vehicle ECU is malfunctioning; and
  determine, when the response from the second in-vehicle device is obtained within the predetermined period, that the second in-vehicle ECU is normal.

17. The in-vehicle system according to claim 5, wherein the control unit of the first in-vehicle ECU is configured to, after obtaining the signal from the first in-vehicle device:
  determine, when a response from the second in-vehicle device is not obtained within a predetermined period, that the second in-vehicle ECU is malfunctioning; and
  determine, when the response from the second in-vehicle device is obtained within the predetermined period, that the second in-vehicle ECU is normal.

18. The in-vehicle system according to claim 3, wherein the control unit of the first in-vehicle ECU is configured to:
  further output, when a response to the signal is not obtained from the second in-vehicle device within a predetermined period, a confirmation signal to the second in-vehicle ECU over the communication line;
  determine, when a response to the confirmation signal is not obtained from the second in-vehicle ECU, that the second in-vehicle ECU is malfunctioning; and
  determine, when a response to the confirmation signal is obtained from the second in-vehicle ECU, that the second in-vehicle ECU is normal.

19. The in-vehicle system according to claim 4, wherein the control unit of the first in-vehicle ECU is configured to:
  further output, when a response to the signal is not obtained from the second in-vehicle device within a predetermined period, a confirmation signal to the second in-vehicle ECU over the communication line;
  determine, when a response to the confirmation signal is not obtained from the second in-vehicle ECU, that the second in-vehicle ECU is malfunctioning; and
  determine, when a response to the confirmation signal is obtained from the second in-vehicle ECU, that the second in-vehicle ECU is normal.

20. The in-vehicle system according to claim 5, wherein the control unit of the first in-vehicle ECU is configured to:
  further output, when a response to the signal is not obtained from the second in-vehicle device within a predetermined period, a confirmation signal to the second in-vehicle ECU over the communication line;
  determine, when a response to the confirmation signal is not obtained from the second in-vehicle ECU, that the second in-vehicle ECU is malfunctioning; and
  determine, when a response to the confirmation signal is obtained from the second in-vehicle ECU, that the second in-vehicle ECU is normal.

\* \* \* \* \*